(12) United States Patent
Wasserman et al.

(10) Patent No.: US 9,412,130 B2
(45) Date of Patent: Aug. 9, 2016

(54) ASSISTANCE ON THE GO

(71) Applicant: Allstate Insurance Company, Northbrook, IL (US)

(72) Inventors: Robert Wasserman, Wheaton, IL (US); Tara Cavallaro Kozlowski, Geneva, IL (US); Ryan M. Briggs, Glen Ellyn, IL (US); Imran Iqbal, Hoffman Estates, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 14/611,915

(22) Filed: Feb. 2, 2015

(65) Prior Publication Data
US 2016/0092962 A1    Mar. 31, 2016

Related U.S. Application Data

(63) Continuation-in-part of application No. 12/859,627, filed on Aug. 19, 2010, now Pat. No. 9,070,243.

(60) Provisional application No. 61/255,349, filed on Oct. 27, 2009, provisional application No. 61/235,217, filed on Aug. 19, 2009.

(51) Int. Cl.
   *G07B 15/02* (2011.01)
   *G06F 17/00* (2006.01)
   *G06Q 30/06* (2012.01)

(52) U.S. Cl.
   CPC ........ *G06Q 30/0631* (2013.01); *G06Q 30/0635* (2013.01)

(58) Field of Classification Search
   CPC ........................ H04W 4/02; G06Q 30/0269
   USPC ................................ 235/375, 384; 705/4, 13
   See application file for complete search history.

(56) References Cited

U.S. PATENT DOCUMENTS

D426,206  S    6/2000  Richter
D434,419  S   11/2000  Bomze et al.
6,233,563 B1   5/2001  Jefferson et al.
(Continued)

FOREIGN PATENT DOCUMENTS

CN    101252627 A    8/2008
EP      1320004 A1    6/2003

OTHER PUBLICATIONS

Mar. 23, 2015—(US) Non Final Office Action—U.S. Appl. No. 13/446,192.
(Continued)

*Primary Examiner* — Jamara Franklin
(74) *Attorney, Agent, or Firm* — Banner & Witcoff, Ltd.

(57) ABSTRACT

A mobile computerized apparatus or method configured to coordinate towing facilities and roadside assistance providers and their available capacity to tow and provide roadside assistance and match users with those towing facilities and roadside assistance providers is disclosed. The apparatus or method may be configured to consider the following factors in matching the towing facilities/roadside assistance providers and users: (a) availability of nearby towing facilities; (b) telematics information from the vehicle to assist with the diagnosis/repairs; (c) preset preferences of the user; (d) insurance information (such as the type of the vehicle the user has and the user's home address); and (e) the capabilities of the towing facility.

14 Claims, 9 Drawing Sheets

(56) References Cited

U.S. PATENT DOCUMENTS

| | | |
|---|---|---|
| 6,298,229 B1 | 10/2001 | Tomlinson, Jr. et al. |
| D453,767 S | 2/2002 | Istvan et al. |
| 6,415,226 B1 | 7/2002 | Kozak |
| D464,660 S | 10/2002 | Weng et al. |
| 6,493,629 B1 | 12/2002 | Van Bosch |
| 6,522,265 B1 | 2/2003 | Hillman et al. |
| D474,479 S | 5/2003 | Tambata |
| D474,780 S | 5/2003 | Tambata |
| D475,719 S | 6/2003 | Horie |
| 6,677,854 B2 | 1/2004 | Dix |
| 6,745,153 B2 | 6/2004 | White et al. |
| D495,338 S | 8/2004 | Peter et al. |
| 6,771,742 B2 | 8/2004 | McCalmont et al. |
| 6,847,825 B1 | 1/2005 | Duvall et al. |
| D517,087 S | 3/2006 | Sands |
| 7,012,993 B2 | 3/2006 | Alton |
| 7,024,205 B1 | 4/2006 | Hose |
| 7,027,808 B2 | 4/2006 | Wesby |
| D522,015 S | 5/2006 | Cummins et al. |
| D523,442 S | 6/2006 | Hiramatsu |
| 7,068,994 B2 | 6/2006 | Van Camp |
| 7,091,903 B2 | 8/2006 | Kim |
| 7,092,695 B1 | 8/2006 | Boling et al. |
| 7,099,835 B2 | 8/2006 | Williams, III |
| D529,507 S | 10/2006 | Cummins |
| D529,510 S | 10/2006 | Cummins et al. |
| 7,119,669 B2 | 10/2006 | Lundsgaard et al. |
| 7,130,406 B2 | 10/2006 | Pines et al. |
| 7,142,959 B2 | 11/2006 | Oesterling et al. |
| 7,155,335 B2 | 12/2006 | Rennels |
| 7,167,796 B2 | 1/2007 | Taylor et al. |
| 7,215,965 B2 | 5/2007 | Fournier et al. |
| D544,871 S | 6/2007 | Lim et al. |
| 7,236,576 B2 | 6/2007 | Schnarel et al. |
| 7,242,966 B1 | 7/2007 | Averkamp |
| D550,689 S | 9/2007 | Vigesaa |
| 7,266,435 B2 | 9/2007 | Wang et al. |
| D553,146 S | 10/2007 | Byeon et al. |
| 7,289,786 B2 | 10/2007 | Krasner |
| D556,770 S | 12/2007 | O'Donnell et al. |
| D560,226 S | 1/2008 | Jung et al. |
| 7,323,973 B1 | 1/2008 | Ceglia et al. |
| D561,191 S | 2/2008 | Haning et al. |
| 7,336,172 B2 | 2/2008 | Govindaraj |
| D563,975 S | 3/2008 | Vigesaa |
| D564,541 S | 3/2008 | Lettau et al. |
| 7,343,565 B2 | 3/2008 | Ying et al. |
| D565,581 S | 4/2008 | Gunn et al. |
| 7,389,244 B2 | 6/2008 | Kaplan |
| 7,405,537 B2 | 7/2008 | Hoffman et al. |
| D574,842 S | 8/2008 | Kwag et al. |
| D575,302 S | 8/2008 | Millar et al. |
| 7,421,321 B2 | 9/2008 | Breed et al. |
| D578,134 S | 10/2008 | Jasinski |
| D579,946 S | 11/2008 | Lee et al. |
| 7,457,693 B2 | 11/2008 | Olsen et al. |
| 7,460,019 B2 | 12/2008 | Henderson |
| 7,463,951 B2 | 12/2008 | Ampunan et al. |
| 7,480,546 B2 | 1/2009 | Kamdar et al. |
| D586,355 S | 2/2009 | Mori et al. |
| 7,487,111 B2 | 2/2009 | Shoen et al. |
| 7,499,714 B2 | 3/2009 | Ki |
| D592,223 S | 5/2009 | Neuhaus |
| D593,110 S | 5/2009 | Danton |
| D593,111 S | 5/2009 | Danton |
| D594,465 S | 6/2009 | Hong et al. |
| D594,468 S | 6/2009 | Bamford et al. |
| 7,593,855 B1 | 9/2009 | Craig |
| 7,602,388 B2 | 10/2009 | Plut |
| D605,657 S | 12/2009 | Danton |
| D607,464 S | 1/2010 | Tang et al. |
| D608,366 S | 1/2010 | Matas |
| D611,056 S | 3/2010 | Langlois et al. |
| D618,249 S | 6/2010 | Ahn et al. |
| D618,696 S | 6/2010 | Woods et al. |
| D618,700 S | 6/2010 | Song |
| D618,702 S | 6/2010 | Lee |
| D621,849 S | 8/2010 | Anzures et al. |
| D623,555 S | 9/2010 | Reithlingshoefer et al. |
| D624,556 S | 9/2010 | Chaudhri |
| D624,589 S | 9/2010 | Robbins |
| 7,802,722 B1 | 9/2010 | Papierniak et al. |
| D625,312 S | 10/2010 | Jewitt et al. |
| 7,813,980 B2 | 10/2010 | Crockett |
| D631,889 S | 2/2011 | Vance et al. |
| D642,194 S | 7/2011 | Kozlowski et al. |
| D645,051 S | 9/2011 | Kozlowski et al. |
| 8,289,171 B2 | 10/2012 | Morley |
| 8,315,792 B2 | 11/2012 | Speier et al. |
| 8,606,512 B1 | 12/2013 | Bogovich et al. |
| 8,645,014 B1 | 2/2014 | Kozlowski et al. |
| 8,750,902 B2 * | 6/2014 | Xiao ............. H04W 4/023 455/456.3 |
| 8,781,657 B2 | 7/2014 | Pebbles |
| 8,799,034 B1 | 8/2014 | Brandmaier et al. |
| 8,805,707 B2 | 8/2014 | Schumann, Jr. et al. |
| 2002/0055861 A1 | 5/2002 | King et al. |
| 2002/0096561 A1 | 7/2002 | Sullivan |
| 2002/0184653 A1 | 12/2002 | Pierce et al. |
| 2003/0088347 A1 | 5/2003 | Ames |
| 2004/0024711 A1 | 2/2004 | Camping et al. |
| 2004/0100479 A1 | 5/2004 | Nakano et al. |
| 2004/0111195 A1 | 6/2004 | Vries et al. |
| 2004/0192336 A1 | 9/2004 | Walby |
| 2004/0203850 A1 | 10/2004 | Oesterling |
| 2004/0221239 A1 | 11/2004 | Hachigian et al. |
| 2005/0027438 A1 | 2/2005 | Rockett et al. |
| 2005/0091272 A1 | 4/2005 | Smith et al. |
| 2005/0187833 A1 | 8/2005 | Royer et al. |
| 2005/0197771 A1 | 9/2005 | Seick et al. |
| 2005/0261986 A1 | 11/2005 | Haynes et al. |
| 2006/0022846 A1 | 2/2006 | Tummala |
| 2006/0123360 A1 | 6/2006 | Anwar et al. |
| 2006/0245570 A1 | 11/2006 | Pfleging et al. |
| 2006/0247852 A1 | 11/2006 | Kortge et al. |
| 2006/0291633 A1 | 12/2006 | Glaza et al. |
| 2007/0011278 A1 | 1/2007 | Nou |
| 2007/0033540 A1 | 2/2007 | Bridges et al. |
| 2007/0066276 A1 | 3/2007 | Kuz et al. |
| 2007/0072625 A1 | 3/2007 | Fournier et al. |
| 2007/0088473 A1 | 4/2007 | Moon et al. |
| 2007/0122026 A1 | 5/2007 | Ersue et al. |
| 2007/0139182 A1 | 6/2007 | O'Connor et al. |
| 2007/0142026 A1 | 6/2007 | Kuz et al. |
| 2007/0167147 A1 | 7/2007 | Krasner et al. |
| 2007/0185728 A1 | 8/2007 | Schwarz et al. |
| 2007/0240079 A1 | 10/2007 | Flynt et al. |
| 2007/0244628 A1 | 10/2007 | Rockett et al. |
| 2007/0252689 A1 | 11/2007 | Rothschild |
| 2007/0298765 A1 | 12/2007 | Dickinson et al. |
| 2008/0004790 A1 | 1/2008 | Ames |
| 2008/0014908 A1 | 1/2008 | Vasant |
| 2008/0054072 A1 | 3/2008 | Katragadda et al. |
| 2008/0119203 A1 | 5/2008 | Shalmon et al. |
| 2008/0140287 A1 | 6/2008 | Yang et al. |
| 2008/0177653 A1 | 7/2008 | Famolari et al. |
| 2008/0215240 A1 | 9/2008 | Howard et al. |
| 2008/0261554 A1 | 10/2008 | Keller et al. |
| 2008/0319665 A1 | 12/2008 | Berkobin et al. |
| 2009/0002145 A1 | 1/2009 | Berry et al. |
| 2009/0072995 A1 | 3/2009 | Thomas et al. |
| 2009/0093236 A1 | 4/2009 | Balan et al. |
| 2009/0125178 A1 | 5/2009 | Wilson |
| 2009/0210142 A1 | 8/2009 | Couckuyt et al. |
| 2009/0216600 A1 | 8/2009 | Hill |
| 2009/0233572 A1 | 9/2009 | Basir |
| 2010/0138242 A1 | 6/2010 | Ferrick et al. |
| 2010/0207787 A1 | 8/2010 | Catten et al. |
| 2010/0332133 A1 | 12/2010 | Harris et al. |
| 2011/0082816 A1 | 4/2011 | Moffett |
| 2011/0213628 A1 | 9/2011 | Peak et al. |
| 2012/0136743 A1 | 5/2012 | McQuade et al. |
| 2012/0179363 A1 | 7/2012 | Pierfelice |
| 2014/0222618 A1 | 8/2014 | Stamp et al. |

(56) References Cited

U.S. PATENT DOCUMENTS

OTHER PUBLICATIONS

Mar. 23, 2015—(US) Non Final Office Action—U.S. Appl. No. 13/446,146.
Mar. 13, 2015—(US) Notice of Allowance—U.S. Appl. No. 12/859,627.
May 26, 2015—(US) Non-Final Office Action—U.S. Appl. No. 13/446,146.
"Roadside Assistance with Emergency Roadside Service", http://www.geico.com/getaquote/auto/emergency-road-service/, downloaded Feb. 25, 2015, pp. 1-5.
BoatUS Towing App—Free for All Boaters—BoatUS, http://www.boatus.com/towing/app.asp, downloaded Feb. 25, 2015, pp. 1-2.
Software Engineering for Service-Oriented Overlay Computers, D1.4a: UML for Service-Oriented Systems, Sensoria, Oct. 10, 2007, pp. 1-21.
Lapadula, A., COWS Specification of the on Road Assistance Scenario, Dec. 19, 2007, pp. 1-9.
BMW Assist™ Safety & Convenience Services © 2008 BMW of North America, LLC., 16 pages.
Allstate Motor Club Launches Roadside Assistance Mobile App for iPhone and BlackBerry Users, Oct. 27, 2009; http://money.cnn.com/news/newsfeeds/articles/prnewswire/2009102711, 2 pages.
TMC News, ATX Launches Enhanced Automatic Collision Notification for BMW, Jan. 11, 2009, http://tmcnet.com/usubmit/2009/01/11/3905139.htm, 4 pages.
Automotive Fleet, Aug. 2009, vol. 48, No. 9, Charging for Preventable Accidents: What's the Payoff?, Grace Lauron, 4 pages.
Automotive Fleet, May 2009, Bright Ideas Energize Fleet Management, Cindy Brauer and Thi Dao, 5 pages.
Automotive Fleet, Sep. 2009 vol. 48 No. 10, DWT Proven to Increase Accidents, Grace Lauron, 5 pages.
Motorola Demonstrates New Communications System Available in BMW's Global 2005 Model Year Vehicle Line, http://www.virtualizationconference.com/49572/print, 2 pages, retrieved on Feb. 6, 2009.
BMW Assist, Safety & Convenience Services © 2006 BMW of North America, LLC, 16 pages.
Automotive Fleet, Emkay Partners With Networkcar to Launch New Networkfleet Telematics Solution, Apr. 29, 2008, © 2009 Automotive Fleet, 1 page.
Geotab Management by Measurement, Geotab for Insurance Companies © 2008, 1 page.
CIO, High-tech Cars: The Coolest Automotive Technologies, Denise Dubie, Network World, Oct. 5, 2008, http://www.cio.com/article/print/452913, retrieved on Feb. 6, 2009, 2 pages.
Inrix News, INRIX Real-Time Traffic Now Available on Over 75 Navigation and Mobile Devices, Jul. 30, 2007, http://www.inrix.com/news_75Devices_30July2007.asp, retrieved Feb. 6, 2009, 1 page.
ABIresearch, Wireless Connectivity to the Automobile Is Hindered by Lack of Standards and Interoperability, Jul. 31, 2007, http://www.abiresearch.com/abiprdisplay.jsp?pressid=894, retrieved on Feb. 6, 2009, 1 page.
When Accidents Happen, Nationwide Mobile App for IPhone is on Your Side, Melanie Broemsen, May 10, 2009, http://www.articlesbase.com/print/909297, retrieved on Jun. 23, 2009, 1 page.
Diagnostic Trouble Codes (DTCs) Powertrain Codes for OBD II (OBD-2) equipped GM vehicles, compiled by Anthony W. Haukap; http://myweb.accessus.net/~090/dtocbd2p.html; retrieved on Jul. 20, 2009, 20 pages.
Automotive Fleet, OnStar Receives Honors at Telematics Update Awards © 2009 Automotive Fleet, http://www.automotive-fleet.com/News/Print/Story/2008/05/OnStar Receives, retrieved on Feb. 6, 2009, 1 page.
Real time traffic broadcast to debut in Australia, http://www.gpsbusinessnews.com, retrieved Feb. 6, 2009 1 page.
ABIresearch, In-Vehicle Infotainment Storage and Networking, Hard Disks, Flash Memory, USB, SD, Bluetooth, UWB, iPod Kits and Other Technologies, http://www.abiresearch.com/producs/market_research/In-Vehicle_Infotainment, retrieved on Feb. 6, 2009, 2 pages.
TechWorld, Pimp your ride: Cool car technology, Denise Dubie (Network World) Jul. 10, 2008; http://www.techworld.com/au/article/262977/pimp_your_ride_cool_car, retrieved on Feb. 6, 2009, 3 pages.
Maya Software Technologies, White Paper, Automotive Telematics—Market Overview and Security Considerations © 2001, 12 pages.
Intomobile, Volkswagen Launches iPhone Optimized Website Featuring Access to Emergency Roadside Assistance, http://www.intomobile.com/2009/03/30/volkswagen-launches-iPhone-optimized-website-featuring-access, retrieved on Jun. 23, 2009, 3 pages.
RepairPal for iPhone, http://repairpal.com/mobile, retrieved Feb. 2, 2009, 13 pages.
TradeVibes, The RepairPal iPhone App is Available! © 2007-2008 Mill River Labs, www.tradevibes.com/news/view/repairpal?article=86228, retrieved on Feb. 2, 2009, 1 page.
Übergizm™, RepairPal: Roadside Assistance from the iPhone, posted Jan. 22, 2009, http://www.ubergizmo.com/15/archives/2009/01/repairpal_roadside_assistance, retrieved on Feb. 2, 2009, 1 page.
Automotive Fleet, Sep. 2009 vol. 48 No. 10, 10 Recommendations: What Drivers Should Do After a Fleet Accident, Mike Antich, 4 pages.
Automotive Fleet/2009 NAFA Planning Guide, NAFA 2009 Institute & Expo Advanced Planning Guide, 2 pages.
U.S. Appl. No. 29/396,366, filed Jun. 29, 2011.
U.S. Copyright Registration No. TX 7-150-082, "Mini Road Assist", registered on Mar. 19, 2010.
U.S. Copyright Registration No. TX 7-329-434, "Mini Road Assist", registered on Mar. 19, 2010.
U.S. Copyright Registration No. TX 7-150-080, "Mini Road Assist", registered Mar. 29, 2010.
U.S. Copyright Registration No. TX 7-195-526, "Allstate Motor Club Roadside Assistance", registered Mar. 30, 2010.
U.S. Copyright Registration No. TX 7-229-997, "Allstate Motor Club Roadside Assistance", registered Mar. 19, 2010.
U.S. Copyright Registration No. TX 7-150-076, "Allstate Motor Club Roadside Assistance", registered Mar. 26, 2010.
Jan. 16, 2013 (US) Non-Final Office Action—U.S. Appl. No. 12/859,634.
Jun. 7, 2013 (US) Notice of Allowance—U.S. Appl. No. 12/859,634.
Jul. 25, 2012 (US) Non-Final Office Action—U.S. Appl. No. 12/859,627.
Jan. 15, 2013 (US) Final Office Action—U.S. Appl. No. 12/859,627.
Mar. 23, 2015—(US) Non-Final Office Action—U.S. Appl. No. 13/446,192.

* cited by examiner

ASSISTANCE ON THE GO

The application is a continuation-in-part application to U.S. Non-Provisional application Ser. No. 12/859,627, filed Aug. 19, 2010 which claims priority from both U.S. Provisional Application Ser. No. 61/235,217, entitled "Assistance on the Go," filed Aug. 19, 2009, and U.S. Provisional Application Ser. No. 61/255,349, entitled "Assistance on the Go," filed Oct. 27, 2009, which are both herein incorporated by reference in their entireties.

TECHNICAL FIELD

Aspects of the disclosure relate to roadside service and other enhanced services using a mobile device. More specifically, aspects of the disclosure relate to wireless-enabled devices that communicate with a remote server computer to facilitate and enhance roadside services and other services, such as towing services.

BRIEF DESCRIPTION OF THE DRAWINGS

Aspects of the invention may take physical form in certain parts and steps, embodiments of which will be described in detail in the following description and illustrated in the accompanying drawings that form a part hereof, wherein.

Figure 1:
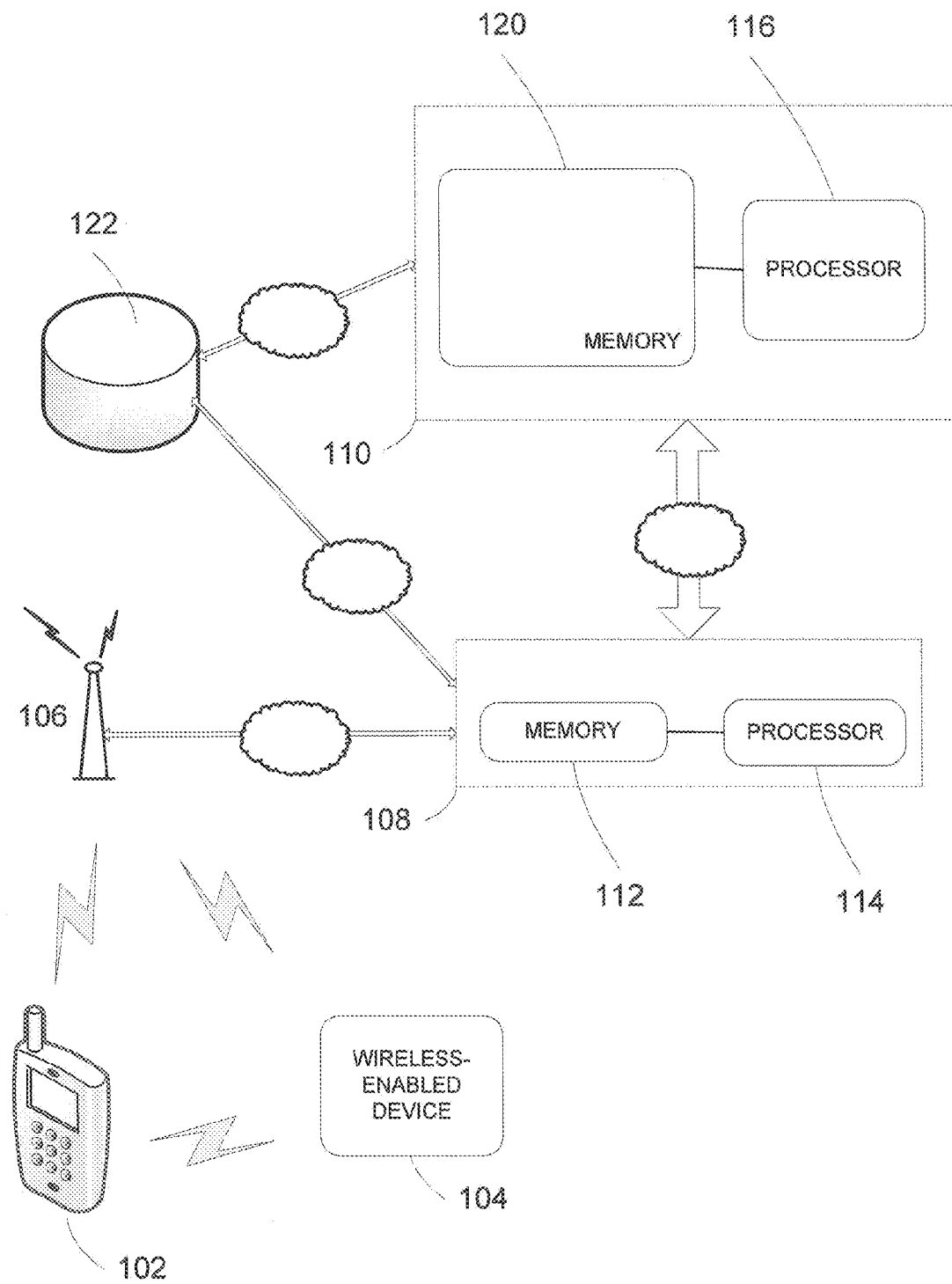
FIG. 1 depicts an illustrative operating environment in accordance with aspects of the invention.

It will be apparent to one skilled in the art after review of the entirety disclosed that the steps illustrated in the figures listed above may be performed in other than the recited order, and that one or more steps illustrated in these figures may be optional.

SUMMARY OF INVENTION

In one embodiment in accordance with aspects of the disclosure, a method for coordinating roadside assistance service providers and their available capacity and matching users that require roadside assistance to those roadside assistance service providers is disclosed. The method may include the steps of: (1) receiving, through a mobile application executing on a mobile device having at least one processor, a roadside assistance request from a user, wherein the roadside assistance request is received through the mobile device; (2) receiving, by the mobile application, telematics information from a telematics device; (3) receiving, by the mobile application, insurance information from an insurance company, wherein the insurance information includes information about the user, vehicle information, and the user's home location; (4) providing, by the mobile application, a prioritized ranking of roadside assistance service providers based on the telematics information, insurance information, and the roadside assistance request; (5) providing, by the mobile application, roadside assistance provider information based on the prioritized ranking of roadside assistance providers; (6) receiving, by the mobile application, a roadside assistance order from the user that includes a selected roadside assistance provider; (7) transmitting, by the mobile application, the roadside assistance order to the selected roadside assistance provider; (8) receiving, by the mobile application, confirmation of the roadside assistance order from the selected roadside assistance provider; and (9) providing, by the mobile application, an electronic payment to the selected roadside assistance provider for the roadside assistance order.

In another embodiment in accordance with aspects of the disclosure, a method for coordinating roadside assistance service providers and their available capacity and matching users that require roadside assistance to those roadside assistance service providers is disclosed. The method may include the steps of: (1) after occurrence of a roadside event to a vehicle, receiving input at a mobile device related to an electronic membership card; (2) retrieving, from a data store, membership information associated with the vehicle, where the membership information includes insurance information and roadside assistance services available to the vehicle to remedy the roadside event, wherein the insurance information includes information about the user, vehicle information, and the user's home location; (3) receiving, by a roadside assistance system with a mobile application executing on the mobile device having at least one processor, a towing request from a user; (4) receiving, by the roadside assistance system, telematics information from a telematics device; (5) providing, by the roadside assistance system, a prioritized ranking of tow truck providers based on the telematics information, the insurance information, and the towing request, wherein the ranking is based on a safest route from a selected tow truck to the vehicle as determined by the roadside assistance system; (6) providing, by the roadside assistance system, tow truck provider information based on the prioritized ranking of tow truck providers; (7) receiving, by the roadside assistance system, a towing order from the user; (8) transmitting, by the roadside assistance system, the towing order to the selected tow truck; and (9) providing, by the roadside assistance system, an electronic payment to the selected tow truck for the towing order to the selected tow truck.

In another embodiment in accordance with aspects of the disclosure, one or more non-transitory computer readable media storing computer readable instructions that, when executed, cause an apparatus to coordinate roadside assistance service providers and their available capacity and match users that require roadside assistance to those roadside assistance service providers is disclosed. The apparatus may provide include the instruction of: (a) after occurrence of a roadside event to a vehicle, receive input at a mobile device regarding the roadside event to the vehicle; (b) receive, through a mobile application executing on the apparatus, a roadside assistance request from a user, wherein the roadside assistance request is received through the mobile device and relates to the roadside event to the vehicle; (c) receive, by the mobile application, telematics information from a telematics device, wherein the telematics information includes information from the vehicle to assist with a diagnosis and repairs for the roadside event to the vehicle; (d) receive, by the mobile application, insurance information from an insurance company, wherein the insurance information includes information about the user, vehicle information, and the user's home address; (e) determine and provide, by the mobile application, a prioritized ranking of roadside assistance providers based on the telematics information, the insurance information, and the roadside assistance request; (f) provide, by the mobile application, roadside assistance service provider information based on the prioritized ranking of roadside assistance service providers; (g) receive, by the mobile application, a roadside assistance order automatically selected by the mobile application based on the roadside assistance service provider that scores the highest according to a preset algorithm, wherein the roadside assistance order include a selected roadside assistance provider; (h) transmit, by the mobile application, the roadside assistance order to the selected roadside assistance provider; and (i) provide, by the mobile application, an electronic payment to the selected roadside assistance provider for the roadside assistance order.

The details of these and other embodiments of the present invention are set forth in the accompanying drawings and the descriptions below. Other features and advantages of the invention will be apparent from the description and the drawings.

DETAILED DESCRIPTION

FIG. 1 depicts an illustrative operating environment in accordance with aspects of the invention. A user of wireless-enabled devices 102, 104 may communicate with a wireless access point 106. The wireless-enabled device 102 may be a mobile telephone with applications and other functionality (e.g., APPLE® iPhone, RESEARCH IN MOTION® Blackberry, HTC® Android-based G1, or other mobile telephone), a handheld device with Wi-Fi connectivity (e.g., APPLE® iTouch), a mobile telephone with an enhanced roadside assistance application installed, or other portable electronic device. The wireless-enabled devices 102, 104 may be configured to communicate with a wireless access point 106 such as a cellular tower operated by a cellular service provider. Alternatively, the wireless access point 106 may be a Wi-Fi (e.g., compatible with IEEE 802.11a/b/g/etc. wireless communication standards) hotspot where the wireless-enabled device 102, 104 may obtain access to the Internet (e.g., to communicate using online chat applications or voice-over-IP applications). One skilled in the art will appreciate that other techniques may be used to allow devices 102, 104 access over a wide area network (WAN).

The data communicated from the user devices 102, 104 may be transmitted to a server 108. The server 108 (e.g., a high-performance Intel® computer) may include a memory 112 storing computer-readable instructions and a processor 114 for executing the computer-readable instructions. The data communicated to the server 108 from the user device 102, 104 may be transmitted over the WAN through wireless access point 106. Meanwhile, another server 110 may be comprised of a memory 120 storing computer-readable instructions and a processor 116 for executing the computer-readable instructions in accordance with aspects of the invention. The memories 112, 120 may also store computer data files that hold information that may be useful to applications running on the user's mobile device 102, 104 or the servers 108, 110. For example, the computer data files may include user login/profile information, insurance policy (or motor club) information, service provider list and related information, and/or other information. The data collected and stored in the data files may be used to support one or more of the numerous features disclosed throughout this disclosure.

One skilled in the art will appreciate that the server (e.g., servers 110 and 108) is not limited to a single machine or device. The server may be embodied as a web server or Internet-accessible server. Furthermore, the term server refers to any system of computers and/or devices (e.g., firewalls, routers, caching systems, proxy servers, etc. or combination thereof) that may be used to provide access to services and features available for use. As such, different reference to the server performing particular steps does not require that the same machine/device perform all the steps.

Servers (108 and 110), data store 122, and wireless access point 106 may communicate over a wired and/or wireless connection. In some instances, a private, secure connection may be established between one or more of these components. For example, server 108 and server 110 may communicate over a network cloud representing the Internet. Alternatively, server 108 and data store 122 may communicate over a secure WAN or a dedicated T1 (or other telecommunications) line. Furthermore, wireless devices 102, 104 may include a processor, memory, display screen (e.g., touchscreen), keypad, sensors (e.g., motion, light, etc.), camera, global positioning system (GPS) chip, audio output/input devices, and other electronic components configured for use in mobile phones, PDAs, and mini-laptops.

In another example, one or more servers 108, 110 may include a processor, RAM, ROM, communications module, and/or memory storing an operating system, applications, and/or data. The server may have a processor for controlling overall operation of the server and its associated components, including random access memory, read-only memory, communications module, and memory. Such a server may include a variety of computer readable media. Computer readable media may be any available media, both tangible and intangible, that may be accessed by the server and include both volatile and nonvolatile media, and removable and non-removable media. By way of example, and not limitation, computer readable media may comprise a combination of computer storage media and communication media. Computer storage media include volatile and nonvolatile, removable and non-removable media implemented in any method or technology for storage of information such as computer readable instructions, object code, data structures, program modules or other data. Computer storage media include, but are not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the server.

The aforementioned server may include one or more applications representing the application data stored in RAM memory while the server is on and corresponding software applications (e.g., software tasks) are running on the server. The aforementioned communications module may include a microphone, keypad, touch screen, and/or stylus through which an (optional) user of the server may provide input, and may also include one or more of a speaker for providing audio output and a video display device for providing textual, audio/visual and/or graphical output. Software may be stored within the memory and/or storage to provide instructions to the processor for enabling the server to perform various functions. For example, memory may store software used by the server, such as an operating system, application programs, and/or an associated database. Alternatively, some or all of the computer executable instructions for the server may be embodied in hardware or firmware. Moreover, a database (or data store) 122 may provide centralized storage of data.

Such a server may operate in a networked environment supporting connections to one or more remote computing devices. The remote computing devices may be personal computing devices or servers that include many or all of the elements described above relative to the server. Remote computing devices may be a mobile device communicating over wireless carrier channel. The network connections depicted in the figures may include a local area network (LAN) and/or a wide area network (WAN), but may also include other networks. When used in a LAN networking environment, the server may be connected to the LAN through a network interface or adapter in the communications module. When used in a WAN networking environment, the server may include a modem in the communications module or other means for establishing communications over the WAN, such as the Internet. It will be appreciated that the network connections shown and described are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various commonly known web browsers can be used to display and manipulate data on web pages.

Figure 2:
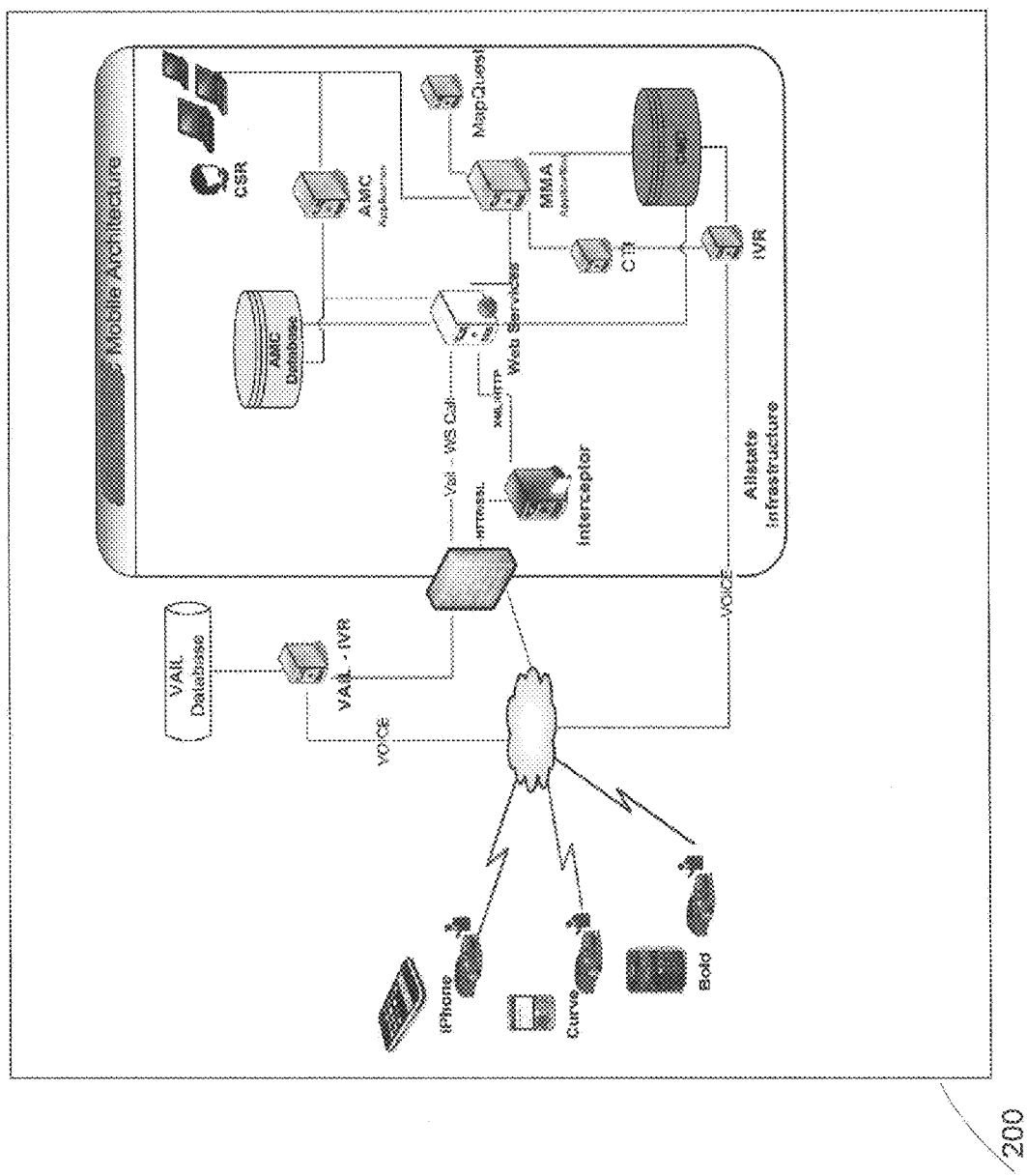
FIG. 2 illustrates an exemplary operating environment in accordance with aspects of the invention.

Referring to FIG. 2, numerous mobile wireless-enabled devices are illustrated connecting to mobile architecture 200 over a wireless network. The mobile architecture includes wired and/or wireless connections with servers, data store/database, and a wireless access point. An interactive voice response (IVR) system may also be included to facilitate services not using a cellular data plan. Numerous different application servers and data stores may be included in the mobile architecture, including, but not limited to, a database, application server, map server, software application for use at a call center or for a customer service platform), CTI (i.e., computer telephony integration—which presents voice and data within a customer service platform), data store in which customer and supporting data tables may be housed), IVR (interactive voice response) server, web services application server, interceptor, and firewall. The mobile wireless-enabled devices in FIG. 2 may have application software installed in accordance with various aspects of the invention. The application software may permit the mobile device to communicate with a remote web services application server through the firewall. In an alternative embodiment, the mobile device may have a thin-client installed that provides an interface for the mobile device to execute application software on a remote server. One skilled in the art will appreciate the numerous advantages and disadvantages related to the thin-client and thick-client design choices contemplated by the various embodiments of the invention. Moreover, in some embodiments, the mobile device may receive notifications of software updates (e.g., new versions) of the application and can receive automatic (or manually authorized) download and installation of the updates.

Flat Tire.

In one example in accordance with aspects of the invention, John Doe's (i.e., a user) vehicle has a flat tire. John has previously installed a roadside assistance application in accordance with various aspects of the invention on his APPLE® iPhone, and he has registered his vehicle with the application. After launching the roadside assistance application, the registered application attempts to assess whether John is in a safe location. If John presses the "911" icon, the application will automatically dial the emergency line to locate emergency assistance for John. However, in this case, John is at the parking garage near his office building, and he presses the "Yes" icon.

Figure 5:
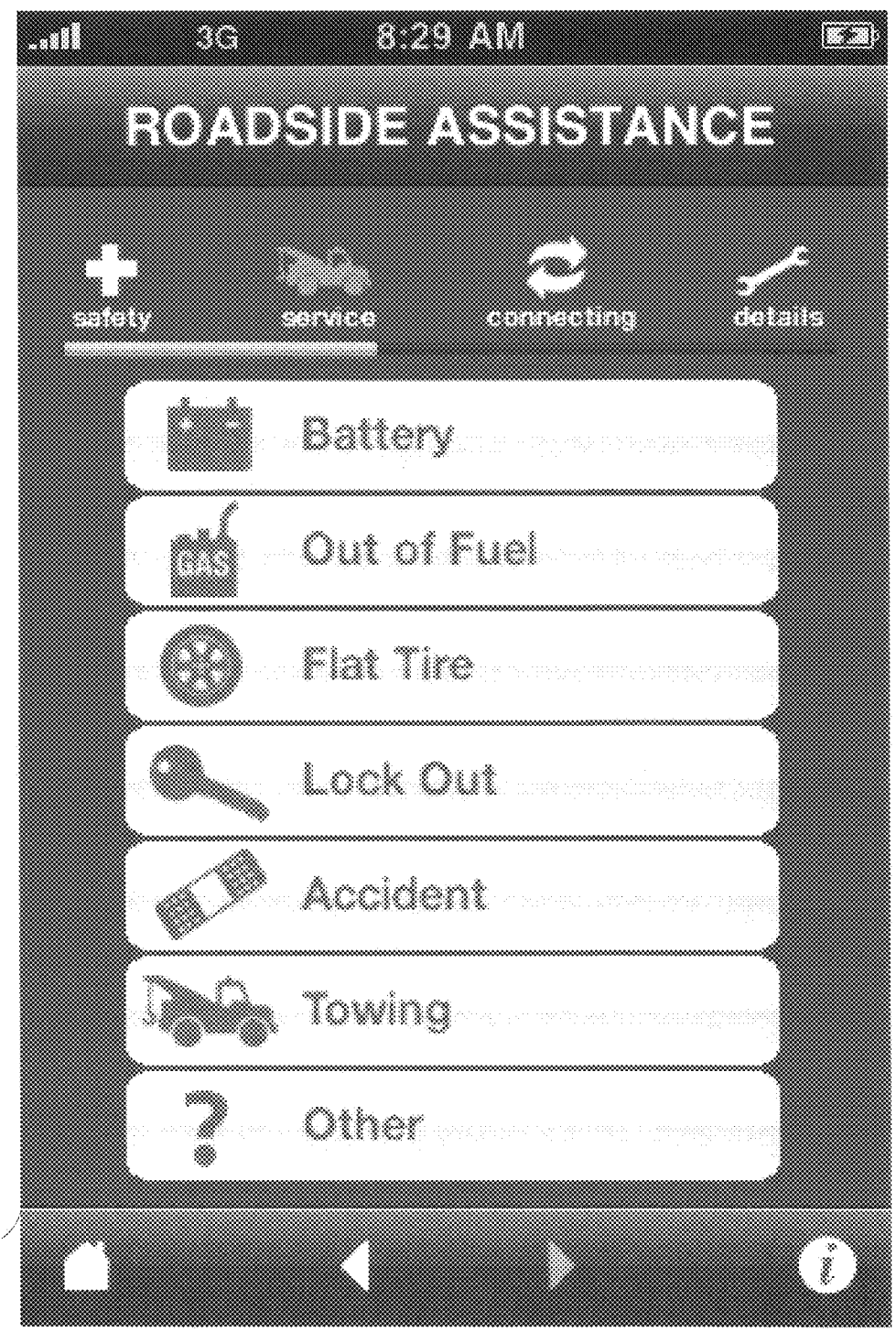

Next the application, in this example, requests information about John's service needs (see FIG. 5). The application provides a list of services 500 to John in a "Service Type" selection box. Some examples of service types include, but are not limited to, locked out (i.e., locked out of one's vehicle), flat tire/tire needs air/tire change, dead battery/battery service/battery replacement, jump start, out of gas/incorrect fuel/fluids, towing, vehicular accident/vehicle fire, mechanical failure/brakes/transmission/engine, lock out/locked out/lost keys/damage keys/keys locked in car, locksmith, winch/stuck, won't start, stalled while driving, reunite, dealer service, transfer, recovery, wrecker, and other (i.e., the service type when none of the listed services are appropriate). In addition, in those cases where the mobile device 102, 104 provides functionality to retrieve and display a user's phone number, the application may retrieve and display that information. John, in some embodiments, may be permitted to edit the callback number displayed by the application if he desires.

In an alternative example, the mobile device 102, 104 may automatically receive information about the vehicle directly through communications with the vehicle's onboard diagnostics system (e.g., ODB II interface or other comparable interface with the vehicle's diagnostics system). The mobile device 102 may be equipped with appropriate circuitry and/or firmware/software to communicate via the requisite communication protocols for the ODB II interface. Alternatively, an external accessory (e.g., peripheral device) may be attached to the ODB II interface to translate the ODB II codes/data into a format compatible with the communication protocol of the application on the mobile device 102, 104. For example, the external accessory may be a bluetooth-compliant device that receives the ODB II data and transmits it via bluetooth to the mobile device 102. Alternatively, the external accessory may attach to the pins on a mobile device 102 and receive the data wirelessly transmitted from the ODB II interface. The information received from the vehicle (e.g., through the ODB II interface) may be used to select the appropriate service type without requiring additional user intervention. Moreover, the ODB II codes may be useful to a service provider (e.g., towing company or mechanic) in contemplating the needs of the user in preparation for addressing the user's calamity.

In yet another alternative example, John's vehicle may be equipped with a wireless transmission module (e.g., transceiver circuitry) to transmit diagnostic information to a car dealership that services his vehicle. The car dealership may then transmit the information to John (e.g., via an onboard display on the vehicle's dashboard). In accordance with various aspects of the invention, assume John Doe is driving a BMW® brand vehicle equipped with BMWAssist®. John may register on a server 108 to have updates from a third party (e.g., BMW) computer server routed through a server 108 to his mobile device 102 whenever a defect in his vehicle is detected. John Doe can designate computer server 108 to receive notifications on his behalf from the third-party server. As such, the computer server 108, in accordance with various aspects of the invention, can process and transmit the notification to John's mobile device 102. For example, the third-party server may receive notification that a flat-tire has occurred on John Doe's vehicle, and may send a notification to John Doe's mobile device 102 indicating the service type required. Consequently, the "Service Type" information may be pre-filled in the application selection screen. Moreover, in such an example, John may or may not need to be physically present at his vehicle. For example, John may have parked his vehicle in an outdoor lot on a cold winter day while at his office, and he may receive a notification (e.g., a push notification available on APPLE® iPhone OS 3.0 and later, SMS message, e-mail, etc.) on his mobile device 102 in the afternoon stating that his battery has gone dead. John may use his mobile device 102, in accordance with the various aspects of the invention disclosed herein, to contact a preferred service provider and repair his vehicle, all while within the comfort of his warm office and not physically present at his vehicle.

Furthermore, the ODB II codes (or other types of diagnostic codes) transmitted from the vehicle to the mobile device 102 may be translated to map against the numerous "Service Type" selections available. ODB II codes (and other types of diagnostic codes) may be different for different make and model of cars; therefore, when a user registers with the application and provides information about his/her vehicle, the appropriate mapping for the type of car can be identified and used for translating diagnostic codes. The mapping table may be stored in computer memory at the mobile device 102 or may be maintained in memory 112 at a remote server 108. Likewise, the translation may occur at a processor at the mobile device 102 or at the remote server 108. One skilled in the art will appreciate that there are numerous benefits and drawbacks to each approach.

Next, mobile device 102 transmits data, either directly or indirectly, to the remote server 108. The transmission may occur in response to a user keypress (e.g., the user selecting a phone icon on the mobile device 102 display). Alternatively, the transmission may occur automatically (e.g., in the embodiments where the ODB II codes are automatically retrieved and transmitted). The data transmitted from the mobile device 102 may include, but is not limited to, the "service type" selected, user identification information (e.g., the mobile device 102 phone number, user's login/username, etc.), location information (e.g., retrieved from the mobile device 102, manually entered by the user, triangulated from cellular towers by the cellular service provider, etc.), vehicle diagnostic data (e.g., OBD II data/codes), and other useful information.

Next, the server 108 receives the data transmitted from the mobile device 102. The server 108 may use the data to identify one or more service providers (e.g., towing company, taxi company, mechanic, etc.) in the area. In one embodiment, the identification may occur in real-time using an algorithmic selection process that maintains ratings and other metrics about the service providers, and selects one or more provider based on these ratings and metrics. In another embodiment, the provider identified may be based on a company's preferred high-quality relationship with particular service providers.

In one embodiment in accordance with aspects of the invention, the server 108 may transmit information about one or more service providers to the mobile device 102 for the user's review and final selection. As such, information such as a service provider's name, contact information, rating, and other metrics (e.g., distance from mobile device's location, cost, etc.) may be displayed on the user's mobile device 102. In an alternative embodiment, the server 108 may communicate directly with a service provider and hire a service provider to service the user. For example, the server 108 may communicate over a network (e.g., the Internet, WAN, etc.) with a service provider's server 110. The server 110 may receive a request for a particular service. The request may include pertinent information about the service required, including the location of the vehicle requiring servicing, the type of service required, the make/model/color of the vehicle requiring servicing, the maximum charge allowed for the service (e.g., pre-contracted towing rates), and other information.

The service provider's server 110 may communicate the information to mobile devices carried by (or installed in the vehicles of) its employees in the field. As such, the employee can accept or reject the new service request. Alternatively, the server 110 may communicate the information to employees located at an office and that are responsible for facilitating new service requests and dispatching service vehicles (e.g., using the Beacon system). Once the service provider accepts the new service request, their server 110 transmits an acceptance message to the server 108. In order to facilitate simultaneous communication to multiple service providers, the server 108 may be required to send a confirmation message to the service provider once acceptance has been received and accepted. At least one benefit of such a system is that multiple service providers may be contacted with a request for a particular service, and then only the "best" service provider willing to accept the service request may be confirmed for the job. In one embodiment in accordance with various aspects of the invention, the service providers may include a price or quote (or other information, such as estimated time of arrival at the user's vehicle) in its acceptance message. As such, service providers may compete (e.g., in an auction-like system) for new servicing jobs. Alternatively, the "best" service provider may simply be the first to reply with an acceptance message. In some embodiments, the server 108 may also transmit a cancellation message to the other service providers (i.e., everyone except the one receiving a confirmation message) once a new service request has been filled so that the other service providers are updated about the current status of filled new service requests. Alternatively, new service requests may automatically expire after a predetermined time period. As such, a cancellation message may not be necessary.

Figure 6:

The server 108 may transmit to the mobile device 102 information about the service provider that will be servicing the user's vehicle. The information may include, but is not limited to the name of the service provider, the estimated time of arrival (ETA), the phone number for the service provider (or the mobile phone number of the particular service vehicle servicing the user's vehicle), and/or other useful information. For example, FIG. 6 illustrates an exemplary "service details" screen 600. In some embodiments, the user is conveniently provided with the option of providing feedback while he/she waits for a service provider to arrive. In some embodiments, the mobile device 102 may receive regular (e.g., every 5 minutes, real-time, or on another regular or periodic basis) updates from the server 108 with the approximate location of the service vehicle that will be servicing the user's vehicle. The approximate location may be displayed on a map or may be provided as an approximate distance from the user's vehicle. Moreover, the approximate time until arrival may be displayed and updated on a regular or periodic basis.

In an alternative embodiment, server 108 may provide the mobile device 102 with information about service providers. The user may contact the service providers directly (e.g., by calling their office) to arrange for a service provider. At least one advantage of such a system over simply looking up service providers in a telephone directory is that the server 108 may be able to provide an enhanced list of service providers to the mobile device 102. For example, the list may include one or more service providers that are competent in the particular type of service required of the user's vehicle. As such, the user need not be concerned with whether a particular service provider offers the particular service required of the user's vehicle.

In addition, the server 108 may transmit relevant information to the user's insurance company, emergency contacts, police, fire department, taxi company, and/or others. For example, information necessary for starting a claim may be submitted to the insurance company so the user's process for submitting the claim is already partially completed. In some embodiments, the user may retain full control over whether the insurance company is notified of the user's vehicle situation.

Moreover, a user's parents, spouse, coworkers, etc. may be contacted to alert them about the user's vehicle situation. For example, in one embodiment, the server 108 may receive notification from the user's mobile device 102, and then reference the user's preferences. A copy of the user's preferences may be saved in memory, e.g., as a data file, at the server 108. The preferences may indicate which additional people or organizations to contact and what information to provide to those people. In another embodiment, the application may enable the user to save his/her emergency contact's information on the mobile device 102. For example, the user may enter his insurance agent's information, personal contact information, and emergency contact information. Alternatively, the screen may permit entry of other relevant information about each contact (e.g., email address, SMS number, alternate phone numbers, etc.) As such, the user may conveniently access his contacts through the application's menu.

In one embodiment, the server 108 may automatically send a text message (e.g., SMS, etc.) to the user's parent's phone number (or other people's phone numbers) with a predetermined message. The server 108 may alternatively send an e-mail message to the desired person/organization's email address. In some embodiments, the desired person may have an application installed on his/her mobile device 102 that receives a push notification initiated by server 108. The push notification may include a textual message and/or other appropriate information (e.g., the location of the vehicle/user, the condition of the vehicle, whether anyone is injured, etc.) Alternatively, a customer service representative may be alerted by server 108 to manually call the desired person/organization and provide an appropriate message.

In another embodiment in accordance with aspects of the disclosure, the user may be provided with a guided experience when requesting roadside assistance. The guided experience may be implemented using a series of icons along the top of the screen on the user's mobile device 102. One skilled in the art will appreciate that the guided experience may be provided through different configurations of the icons; for example, the icons may be placed vertically along a side of the screen, or they may be configured in a circular or other pattern around the screen. The series of icons may tell the user where he/she in the process of obtaining roadside assistance.

Figure 3:
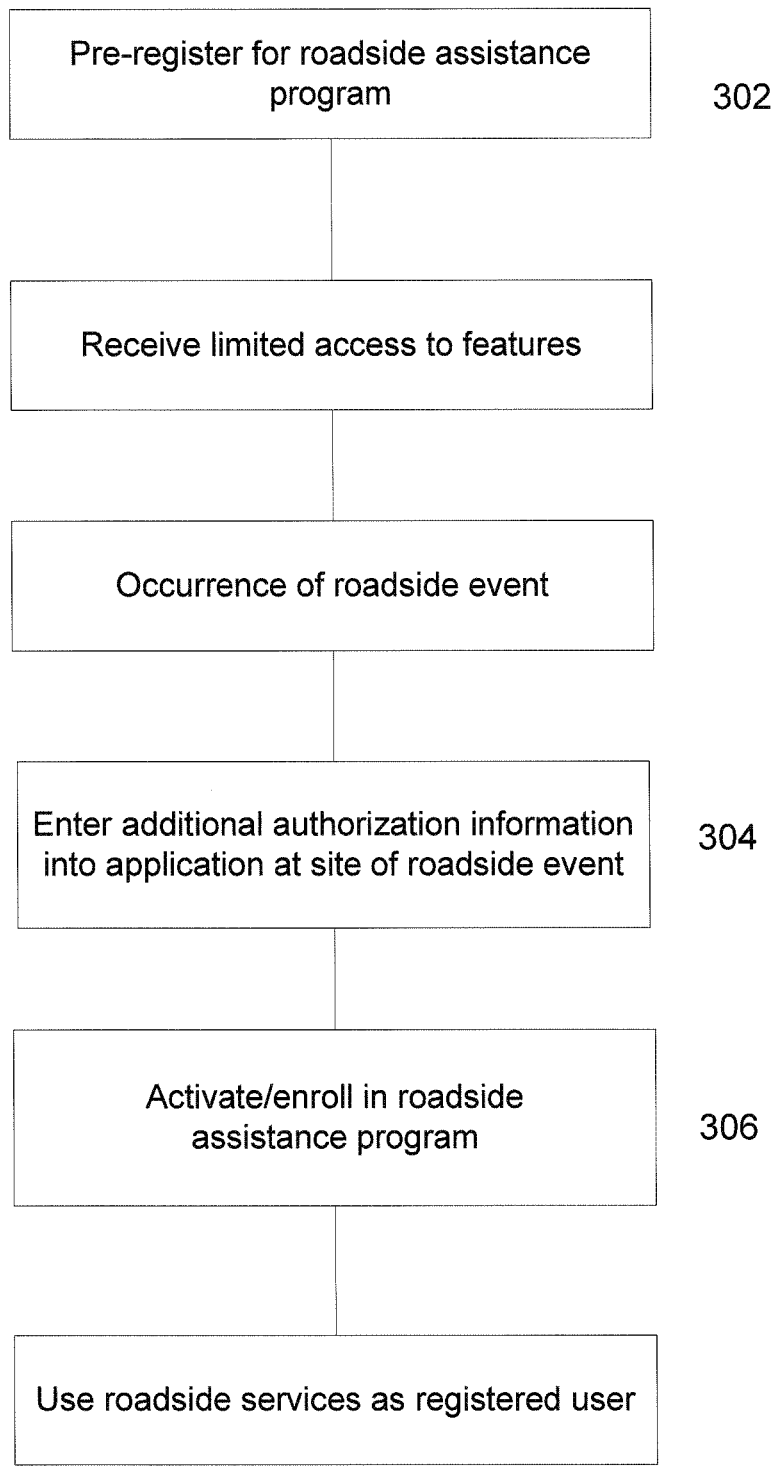
FIG. 3 is a flowchart illustrating the pre-registration process in accordance with aspects of the association.

In some embodiments in accordance with aspects of the invention, the application may verify that the user is in a safe location. An option for calling "911" may be provided should the user require immediate emergency assistance. Next, as depicted in FIG. 3, the application may request information about the type of service the user requires. As discussed in detail above, there are numerous service types 300 that may be available for the user to select. Moreover, as already discussed herein, in some embodiments, the user's vehicle may be equipped with appropriate technology to communicate directly with the mobile device to provide/recommend the service type information. Next, the application may direct the user to call a roadside assistance customer service representative to identify and secure the appropriate roadside service provider for the user. The application on the mobile device 102 may transmit the appropriate information (e.g., member number, member's zip code, service type requested, and/or user's current location) to the customer service center. As such, the representative may already have information about the user and/or user's vehicle on-screen when the conversation begins. Additional information about aspects of this feature are disclosed below, including the use of a caller ID feature to automatically match the user with his/her information.

Once the service provider arrives to provide the user's vehicle with roadside assistance, the user may use his/her mobile device 102 to authorize payment to the service provider. For example, the mobile device 102 may display an icon to permit the user to indicate that service has been satisfactorily provided and completed. Upon receipt of a corresponding message at the server 108 from the mobile device 102, the server 108 may authorize release of funds to the service provider. For example, the server 108 may authorize a bank to perform an ACH transaction of funds directly into the service provider's bank account. In one example, the funds are sourced from the user's bank account; while in another example, the funds are sourced directly from the account of the company providing the roadside assistance program. Meanwhile, in another example a first person (e.g., a parent) may arrange for a second person (e.g., their child) to authorize release of the parent's funds to the service provider. The server 108 may also notify the service provider's server 110 that payment has been authorized. As such, service provider may receive more prompt payment for its services, while also reducing the need to process claims at the insurance company.

Vehicle Incident.

In yet another example in accordance with various aspects of the invention, two user vehicles may be involved in a vehicular crash. In such a scenario, the two users may exchange insurance information and other information (e.g., pictures of the crash site taken with a camera on the mobile device 102) wirelessly using their mobile device 102. For example, an application in accordance with various aspects of the invention may enable the users to wirelessly transmit (e.g., using Bluetooth, SMS messaging, e-mail, or other wireless transmission techniques) their information to the other user's mobile device. At least one benefit is that the exchange of information between the parties is much more convenient given the stressful situation of a vehicular crash.

In addition, the user may contact a customer service representative to report the vehicular incident. In accordance with various aspects of the invention, the representative may already have information about the user and/or user's vehicle on-screen when initiating conversation. For example, the application on the mobile device 102 may transmit the device's phone number and other information (e.g., accident information, user's location, pictures, or other information) to server 108. As such, the representative's system may use the caller ID feature to appropriately identify the transmitted data as corresponding to the phone number identified on the caller ID. Therefore, information about the user and/or user vehicle may already be displayed on the representative's screen when the call commences. Thus, an enhanced roadside assistance program may be offered to users.

Preventive Measures.

As explained earlier, vehicles with onboard diagnostic equipment (e.g., ODB II port) may be able to retrieve information about operating parameters of the user's vehicle. As such, the diagnostic equipment may be able to assist the user in the maintenance and upkeep of the vehicle; thus, resulting in a safer vehicle and hopefully fewer incidents. The mobile device 102 may receive alert notifications when parameters of the vehicle are outside of normal operating limits or limits set by the user or other entity. For example, if the user's battery is dead or low, the user may receive a notification on the mobile device 102 (or elsewhere designated by the user) about the dead or failing car battery. Likewise, if the vehicle's tire pressure runs low, the mobile device 102 may receive a notification. Along with the notification, the mobile device 102 may be provided with one or more service providers (e.g., towing companies, mechanics shops, or other providers) that can repair the problem.

Referring to FIG. 3, the flowchart illustrates various features of the one or more embodiments of the invention. The user may register using the mobile device 102, or may, in some embodiments, register online with a personal computer. Once the user is registered, information about the user (e.g., user profile information) may be stored on the mobile device 102 (or on a remote server 108). That information may be useful in storing and displaying information about the user, including a picture of the user's vehicle, make/model/year of the vehicle, vehicle's insurance policy (or motor club) number (e.g., virtual membership card), and other pertinent information. In some embodiments, the user may only be "pre-registered" 302 (i.e., registered with the application with some basic information (e.g., name, vehicle, phone number, etc.), but may not have a membership in a roadside assistance program); thus, features such as the virtual membership card may be grayed out (i.e., deactivated) on the user's screen. However, in one example, the pre-registered user may provide the application with some basic authentication information (e.g., last four digits of social security number, date of birth, and/or membership number) to authenticate herself, and then need only provide 304 some minimal additional authorization information (e.g., credit card information, vehicle information, driver information, etc.) to activate/register 306 for membership in the roadside assistance program. At least one benefit of pre-registration is that a user can go through the lengthy registration process in advance, and then at the time of a roadside event (e.g., car crash), the user can activate the pre-registration for membership privileges with minimal hassle.

One of ordinary skill in the art will understand that the flowcharts illustrate just some examples of functions/features available in accordance with various aspects of the invention, and that other examples of features are available as described throughout the specification and figures. For example, various aspects of the invention include a feature for obtaining customer feedback. The feature enables prompt and accurate feedback about the user's experience because, inter alia, the feedback is collected almost immediately after the event of interest, and the questions can be tailored to the specifics of the particular event/user/details.

Regarding user vehicle registration, the user may enter various information to register for enhanced roadside assistance. In some embodiments, the user may enter just the vehicle VIN (vehicle identification number). The server 108 and/or mobile device 102 may store the VIN and retrieve information about the vehicle (e.g., made, model, year, etc.) based off the VIN. In an alternative embodiment, the user may also be required to enter membership information, such as name, zip code, or a member identification number. The membership information may be linked to the user's insurance or motor club profile and mapped as such on server 108. As a result, future communications between the mobile device 102 and the server 108 may be recognized as related to a particular member. Membership may refer to membership in a roadside assistance program, motor club, or other group/organization.

Electronic Membership Card.

Figure 4:
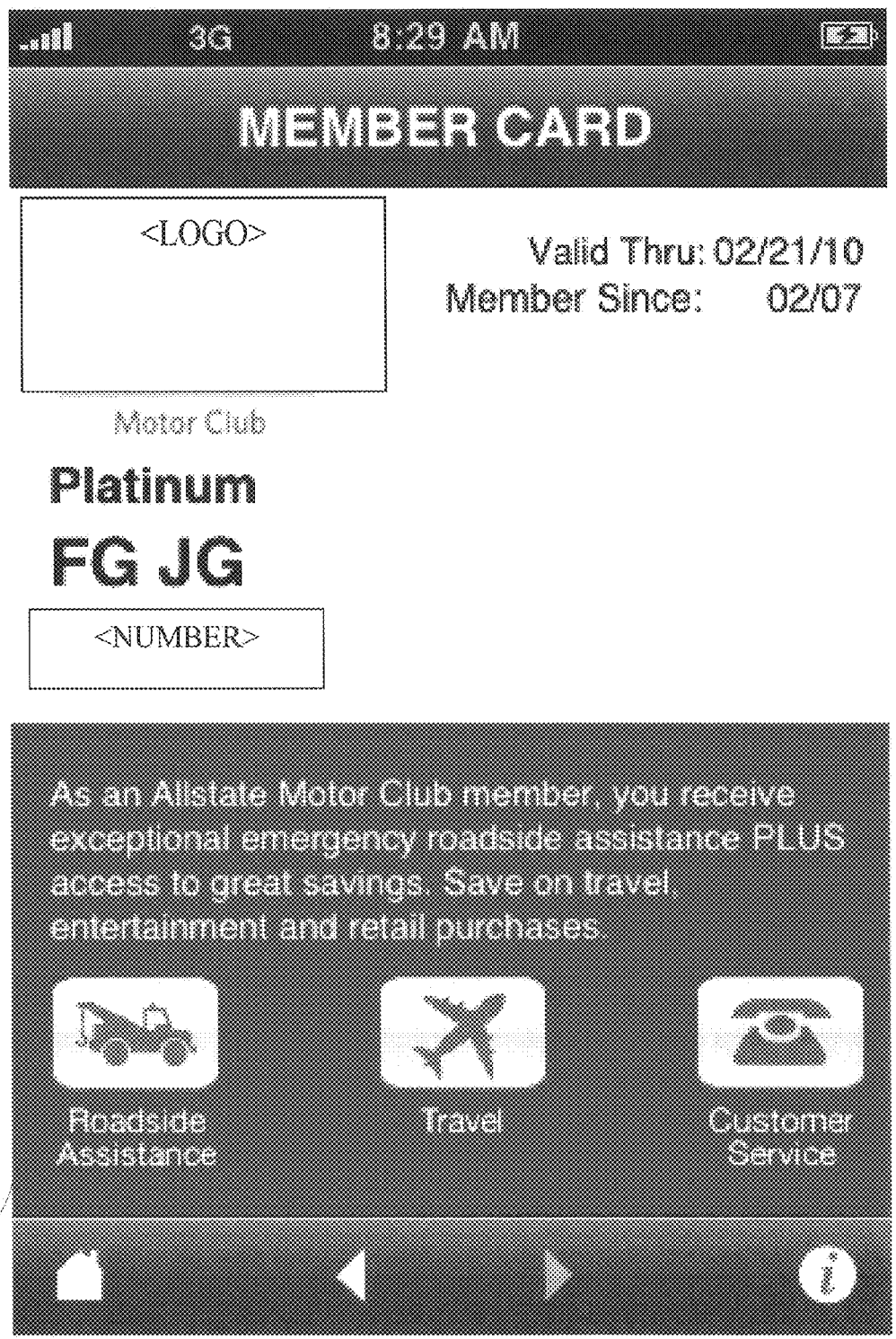
FIGS. 4-6 illustrate exemplary screenshots of an application for roadside assistance in accordance with various aspects of the invention.

Membership information may be illustrated in an exemplary virtual membership card screen, as depicted in FIG. 4. The member card screen 400 may illustrate the date through which the user's membership is valid and/or the date since the user has been a member. The user's membership number, membership level (e.g., Platinum), and other information may also be displayed on the membership card screen. At least some of the information displayed on the membership card screen may be locally stored on the mobile device 102. As such, the user need not be connected to a carrier or WiFi in order to retrieve his/her membership information. Alternatively, membership information may be stored on a server 108 and retrieved for display on the screen. At least one benefit of an electronic membership card is that changes to the user's policy and/or other updates may be dynamically pushed to the user's mobile device 102. As such, the user may have instant access to updated policy information and need not necessarily wait for an insurance company to mail him/her an updated membership card. In addition, the membership card screen may include information about services and promotions offered to members. For example, a roadside assistance icon may appear to indicate that roadside assistance on the go is available to the user. In addition, promotions and discounts, for example on travel (e.g., flights, rental cars, hotels, etc.) may be available to members and a corresponding icon or information may appear on the membership card screen accordingly.

Meanwhile, a service provider may also be provided with a registration screen in some embodiments in accordance with aspects of the invention. Service provider vehicles may be equipped with wireless-enabled devices (e.g., navigation systems with Internet connectivity) that permit the vehicle operator to react in realtime to service requests. For example, the exact location of the service vehicle can be tracked using this onboard device.

Enhanced Interactive Voice Response (IVR). In an alternative embodiment, information from the application on the mobile device 102 may be transmitted to a remote server related to an IVR system. For wireless devices 102 with a mobile data plan, the information may be transmitted over a wireless Internet connection. However, in those instances where the mobile device does not have data connectivity, the device may transmit the data to the IVR system using other available means. For example, in one embodiment, the information may be transmitted as a SMS (or comparable text message format) message to the IVR system. As a result, when a user calls into the IVR system, the user may receive an enhanced experience because the user's location and other relevant information may already be available at the IVR system. The IVR may, in some embodiments, still confirm for security reasons the name of the member, zip code of the member, and service requested before transferring the user to a service provider. The disclosed enhanced IVR is beneficial because it alleviates the requirement to have the user listen to endless prompts and respond with touchtone key presses. In some examples, if the user wishes to speak with a customer service representative, he/she may press "0" (or other designated key) to immediately speak with a representative.

Other features in accordance with various aspects of the invention are listed below. For example, server 108 may generate a user driving score based on the user's reactions to communications and recommendations from an insurance company or a motor club. The driving score may be used to adjust the user's insurance premiums or membership dues and/or other aspects of the user's insurance policy or motor club membership. In another example, the mobile device 102 may provide the user with information regarding the relative safety of proposed navigation routes as, for example, is described in the provisional applications, which were previously incorporated by reference in their entireties. In yet another example, the mobile device 102 may provide different color-coded zones on a map to indicate the relative safety of various areas. For example, the mobile device 102 may alert the user that a particular intersection is particularly hazardous and has a statistically higher frequency of vehicle incidents. One or more of these features may be provided in accordance with various aspects of the invention. In yet another example, the mobile device may provide the user with information regarding the relative safety of drivers or vehicles in the vicinity of the user. This information may be provided through transmission of scores or other data regarding the drivers or vehicles in the vicinity of the user.

In one embodiment in accordance with aspects of the invention, a system is described where two servers and a mobile device assist in providing roadside assistance. The mobile device may communicate with a first server and provide various information about the status of a vehicle, the user, and/or other information. The first server may communicate with a second server to electronically request, approve, and monitor a service provider hired to service the vehicle. The first server may provide information and/or regular updates to the mobile device regarding the service provider. The first server may also authorize payment to the service provider once the job is completed. One or more aspects of the aforementioned embodiment are described in greater detail throughout the disclosure.

Figure 7:
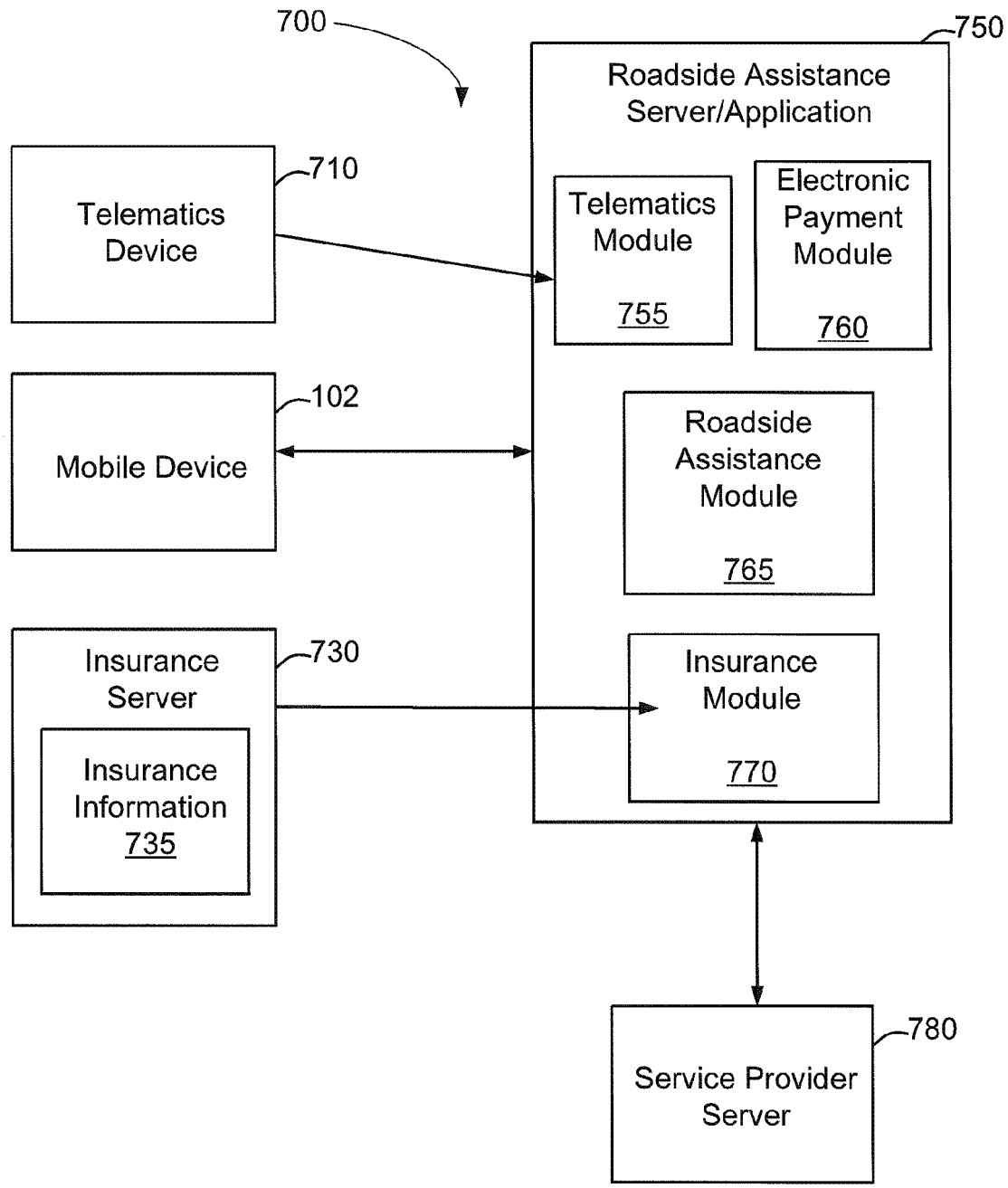
FIG. 7 illustrates an exemplary block diagram of a roadside assistance system and application that may be used to implement various aspects of the disclosure.

In another embodiment in accordance with aspects of this invention, FIGS. 7 and 8 illustrate a roadside assistance system 700 that coordinates towing facilities and roadside assistance providers and their available capacity to tow and provide roadside assistance and matches users with those towing facilities and roadside assistance providers. Generally, the roadside assistance system 700 may provide a system that matches users who need towing services or roadside assistance together with towing service providers and roadside assistance providers by providing real-time supply management and on premise technology at the service providers and/or repair facilities. It is understand to one skilled in the art that the embodiments described and disclosed above and in FIGS. 1-6 may be used together with these embodiments illustrated in FIGS. 7 and 8 and described below.

The roadside assistance system 700 illustrated in FIGS. 7 and 8 discloses a system that involves automated scheduling and the order and receipt of towing services roadside assistance services. The roadside assistance system 700 may allow for roadside assistance facilities and/or towing facilities to pre-register providing towing services or roadside assistance. The roadside assistance system 700 may also allow for users to pre-register to order and/or request towing services or roadside assistance. A user who may need a towing or roadside assistance for their disabled vehicle, may activate an application or "order" in their mobile device or "cell phone." The user may identify that they need a tow or roadside assistance at their present location. The user's present location may be identified by the GPS in the mobile device. The roadside assistance system 700 may consider various factors in providing the automated scheduling services for the tow services. For example, the roadside assistance system 700 may consider: (a) availability of nearby towing facilities; (b) telematics information from the vehicle to assist with the diagnosis/repairs; (c) preset preferences of the user; (d) insurance information (such as the type of the vehicle the user has and the user's home address); and (e) the capabilities of the towing facility. Other factors may be utilized without departing from this invention. The roadside assistance system 700 may then send the tow truck or roadside assistance provider that scores the highest according to a pre-set algorithm using the factors as discussed above. The roadside assistance system 700 may also provide the user the ability to select a tow truck and roadside assistance provider with several options for tow trucks and roadside assistance providers as well as provide various characteristics of the options (such as time to location, quality rating, cost, etc.).

FIG. 7 is an example block diagram of a roadside assistance system 700 and roadside assistance application 705. The roadside assistance application 705 may include a variety of software or firmware modules such as one or more of the following: a telematics module 755, an electronic payment module 760, a roadside assistance module 765, and an insurance module 770. Each of these modules may be utilized by the roadside assistance application 705.

The telematics module 755 may be configured to receive, evaluate, and analyze a user's telematics information, such as location, velocity, direction of travel, route, and destination. The present disclosure may utilize an in-vehicle device or telematics device 710 to collect and provide telematics information as known and used in the art. The in-vehicle device 710 may include a processor with a display or graphical interface that receives and/or collects driving data and/or telematics information and provides additional information based on the driving data. The driving data and/or telematics information may include, but not be limited to: location, instantaneous velocity, average velocity, route, destination, etc. The in-vehicle device 710, which may be configured to receive real-time vehicle data, may provide a driver with visual and/or audible in-vehicle information. The in-vehicle device 710 may process real-time (i.e., near real-time) data and then display the processed information in a meaningful way on a display or graphical user interface (GUI). The in-vehicle device 710 may receive and/or collect critical driving data and store summary information for and/or about the driver. The in-vehicle device 710 may also include telematics information about the service history, previous repairs, and other information that may provide a diagnostic analysis of what repairs or may be needed based on the telematics information.

The in-vehicle device 710 may communicate with a data collection device or on-board diagnostics port of a vehicle to collect the driving data. In another exemplary embodiment, the in-vehicle device 710 may acquire the driving data directly from the device, such as a smart phone, tablet computer, or vehicle navigation system via a built-in accelerometer and/or a Global Positioning System (GPS).

The telematics module 755 may further be configured to recommend or provide a ranked list of service providers based on various factors, such as preferred service providers, safest route, highest rated service providers, types of service providers, etc. Service providers may include those facilities that provide repair services and include towing services and/or towing facilities without departing from this invention. The telematics module 755 may be in communication with the telematics device or in-vehicle device 710, wherein the telematics device 710 sends the telematics information to the telematics module 755. The telematics module 755 may further calculate and provide information regarding distance to nearest tow truck or available service provider, time to travel (with or without traffic) to selected tow trucks or available service providers, route information for selected tow trucks or available service providers, etc.

The electronic payment module 760 may be configured to allow for and provide an electronic payment for the towing service or roadside assistance that is ordered and completed. The electronic payment module 760 may be configured to allow for the electronic payment to be automatic with a pre-entered payment method, such as credit card information, bank information, etc. With the automatic electronic payment method, the electronic payment module 760 will automatically send the payment information to a service provider server 780 after an order has been placed and/or completed. Additionally, the electronic payment module 760 may be configured to allow for manual individual input of payment methods with each roadside assistance order. In the manual electronic payment method, a roadside assistance order may not be complete until the user manually inputs payment information to pay for the roadside assistance or towing. Additionally, the payment may be made or through an intermediary without departing from the invention. The electronic module 760 may provide various benefits, such as: avoiding paying cash "on the hood" or "over the table", which may potentially lead to fraudulent activities; the roadside assistance system 700 can pay the service provider directly; elimination or reduction of driver theft (by eliminating driver contact with cash and co-paying).

The roadside assistance module 765 may be configured to interface with one or more service provider systems during the roadside assistance ordering process. The roadside assistance module 765 may be configured to provide details of a given tow truck or available service providers, such as location, tow truck type, time to dispatch or arrival, cost, service provider ratings, service provider reviews, etc. Additionally, the roadside assistance module 765 may be configured to provide real-time information about a given tow truck or available roadside assistance, such as time-to-arrival. The roadside assistance module 765 may be in communication with a service provider server 780, specifically for the real-time roadside assistance information. The service provider server 780 may be similar to or the same as the server 110 as illustrated in FIG. 1 and described above. Accordingly, a user may be able to receive immediate information about a given tow truck or roadside assistance through the roadside assistance module 765 of the roadside assistance application 705.

Additionally, an insurance module 770 may be included with the roadside assistance application 705. The insurance module 770 may include insurance information 735 that may reside on an insurance server 730 regarding information about a particular user, previous accidents, previous claims, information about other users with similar characteristics, etc. The insurance server 730 may be similar to or the same as the server 108 as illustrated in FIG. 1 and described above. The insurance module 770 may be configured to utilize roadside assistance information and rating factors for providing insurance to the user. The insurance module 770 may derive rating factors for providing insurance based on various information. Additionally, the insurance module 770 may be configured to utilize the insurance information 735 and specifically the knowledge and information of previous accidents and claims to assist in selecting the route or best tow truck or roadside assistance for the user.

Additionally, the insurance module 770 may be configured to utilize the insurance information 735 known about a particular user and insurance information 735 about users with similar characteristics to provide a prioritized rank and/or recommendations regarding routes and service provider locations. Additionally, the insurance module 770 may provide sortable information, such as providing a sortable list of a service provider closest to the user's home, the lowest price, the best ratings or reviews, and/or the fastest estimated time of arrival, etc. The insurance information 735 may be utilized in scheduling the roadside assistance. For example, the insurance information 735 may provide the make/model/type of the vehicle, such as an all-wheel drive vehicle which might establish whether a hook-type tow truck can tow or whether a flatbed tow truck is required. The insurance information 735 may provide whether the vehicle is under warranty and know what the covered services are for the vehicle. The insurance module 770 may provide a reward depending on the service provider selected by the user and potentially the service required and ordered by the user. If the user chooses a priority service provider or safe route for the roadside assistance, the insurance module 770 may provide an insurance reward, such as a discount on future premiums, increased coverage, or decreased deductibles.

Figure 8A:
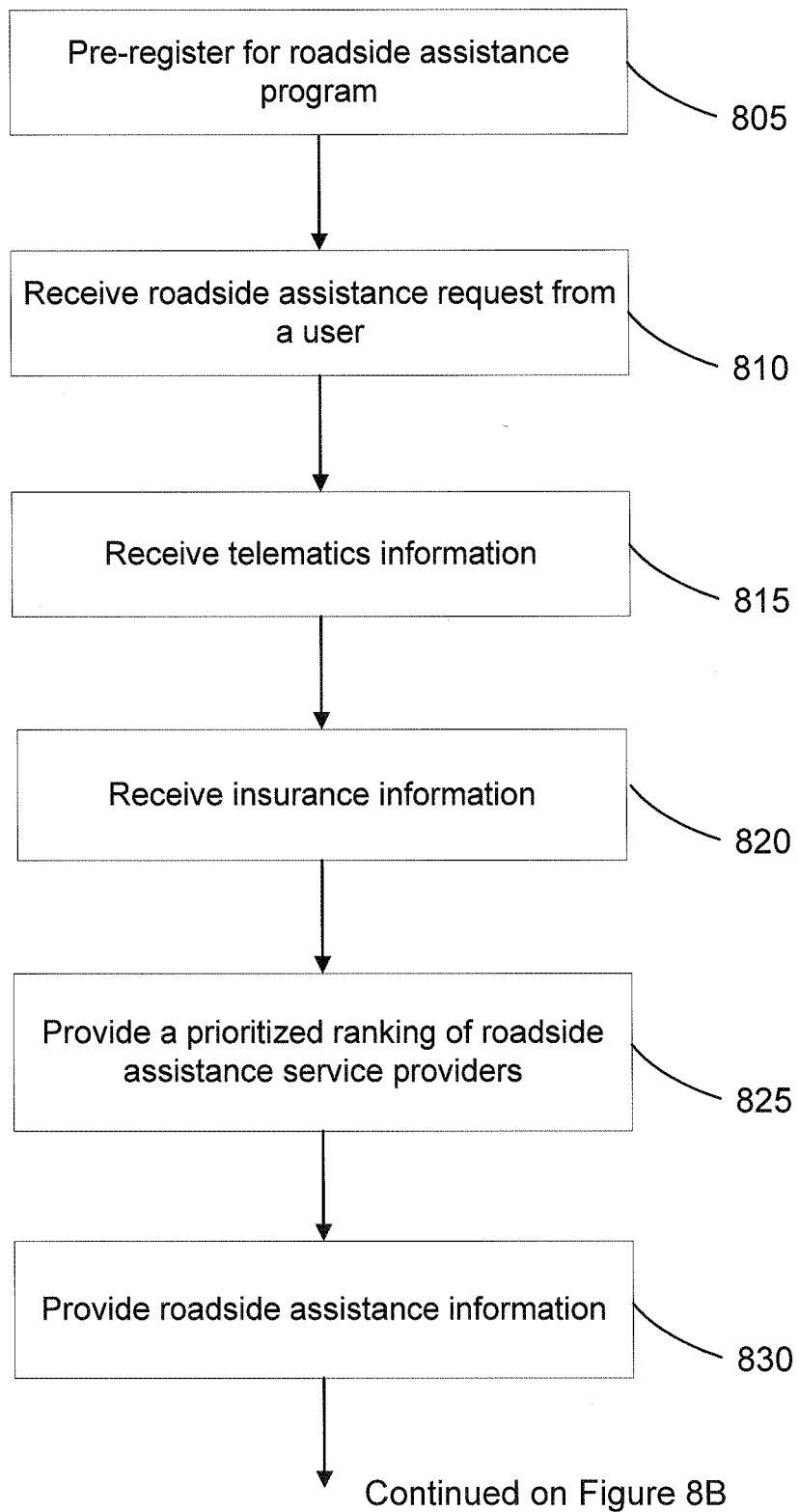
FIGS. 8A and 8B illustrate a method of providing a roadside assistance system and application in accordance with aspects of the disclosure.
Figure 8B:
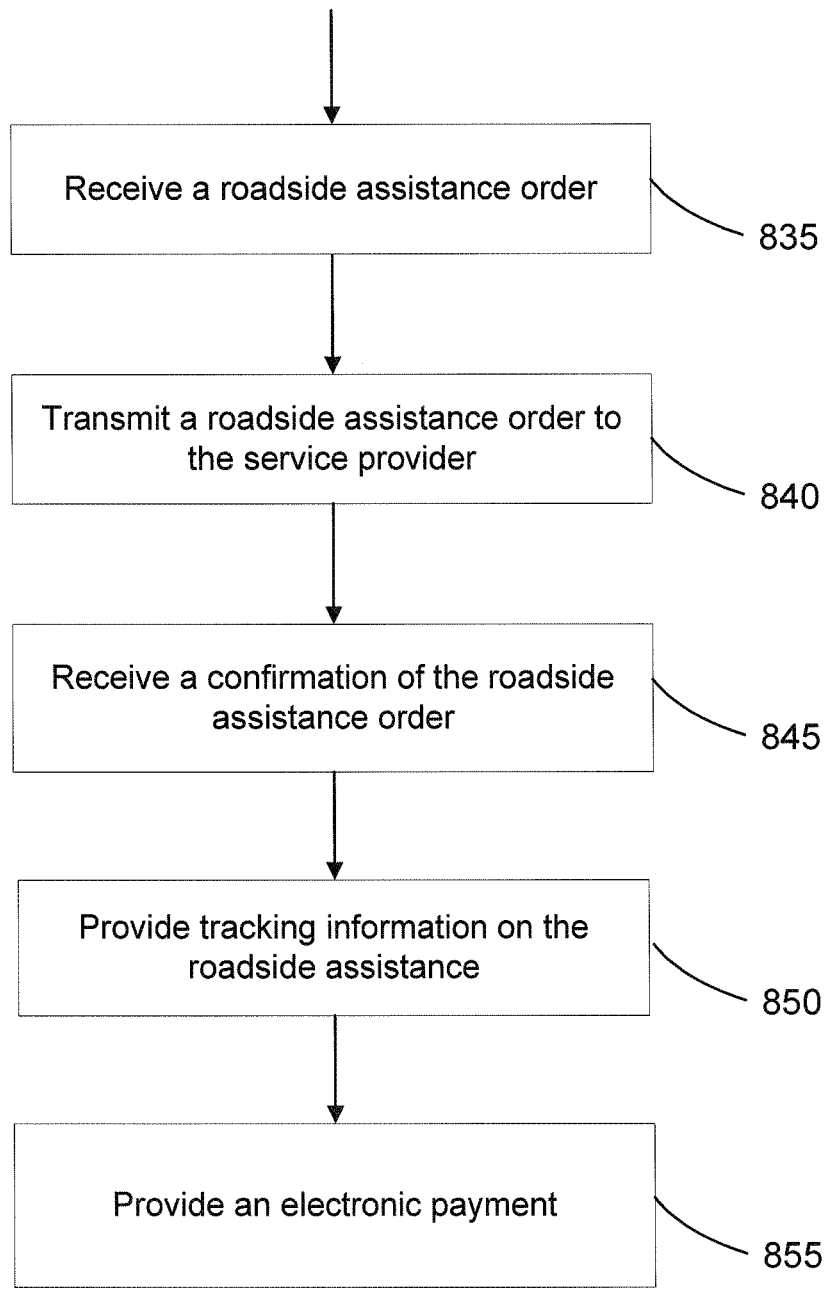

The steps that follow in FIG. 8 may be implemented by one or more of the components in FIGS. 1, 2, and 7 and/or other components, including other computing devices. FIGS. 8A and 8B illustrate an example process 800 by which a user may utilize a computer-implemented method and roadside assistance system 700 and a roadside assistance application 705 with insurance aspects. The roadside assistance application 705 may provide safe and quick ordering of roadside assistance from a user's vehicle. The roadside assistance application 705 may be located on a user's mobile device 102, such as a cell phone, a smart phone, or tablet/laptop computer. The roadside assistance application 705 may also be located on a vehicle's on-board computer or navigation system. The roadside assistance application 705 may be configured to allow for ordering roadside assistance remotely or from a vehicle for pick-up or delivery by providing the use of an application on a mobile device 102 that provides information that allows the ordering. The roadside assistance application 705 may also allow for the electronic payment for the roadside assistance. Telematics information regarding the user and/or the vehicle may be utilized to provide information regarding a user's location, velocity (instantaneous and average), route, and destination. The computer-implemented method and system may utilize this telematics information to provide a prioritized ranked list of service providers for the user.

Referring to FIG. 8A, in step 805, the user may register using the mobile device 102, or may, in some embodiments, register online with a personal computer. Once the user is registered, information about the user (e.g., user profile information) may be stored on the mobile device 102 or on the roadside assistance system 700. That information may be useful in storing and displaying information about the user, including a picture of the user's vehicle, make/model/year of the vehicle, vehicle's insurance policy (or motor club) number (e.g., virtual membership card), and other pertinent information. In some embodiments, the user may only be "pre-registered" (i.e., registered with the application with some basic information (e.g., name, vehicle, phone number, etc.), but may not have a membership in a roadside assistance program); thus, features such as the virtual membership card may be grayed out (i.e., deactivated) on the user's screen. However, in one example, the pre-registered user may provide the application with some basic authentication information (e.g., last four digits of social security number, date of birth, and/or membership number) to authenticate herself, and then need only provide some minimal additional authorization information (e.g., credit card information, vehicle information, driver information, etc.) to activate/register for membership in the roadside assistance program. At least one benefit of pre-registration is that a user can go through the lengthy registration process in advance, and then at the time of a roadside event (e.g., vehicle crash or vehicle breakdown), the user can activate the pre-registration for membership privileges with minimal hassle. Additionally, the user may be required to pass a qualification.

Regarding user vehicle registration, the user may enter various information to register for enhanced roadside assistance. In some embodiments, the user may enter just the vehicle VIN (vehicle identification number). The roadside assistance system 700 and/or mobile device 102 may store the VIN and retrieve information about the vehicle (e.g., make, model, year, etc.) based off the VIN. In an alternative embodiment, the user may also be required to enter membership information, such as name, zip code, or a member identification number. The membership information may be linked to the user's insurance or motor club profile and mapped as such on the roadside assistance system 700. As a result, future communications between the mobile device 102 and the roadside assistance system 700 may be recognized as related to a particular member. Membership may refer to membership in a roadside assistance program, motor club, or other group/organization.

In addition, during step 805, the towing facilities and roadside assistance service providers may also be required or allowed to pre-register or register with the roadside assistance system 700. The pre-approved repair facilities may also engage in and provide towing service and may also be required to pre-register or register with the roadside assistance system 700. By being registered with the roadside assistance system 700, these pre-approved repair facilities find an easy way for repairs to be brought to the repair facilities. The pre-registration or registration process for the towing service providers, roadside assistance service providers, and/or repair facilities may require a qualification. The service providers and/or facilities may be required to pass qualifications as required. The qualification may require proof of training and registration of the tow truck inventory, as well as rating, reviews, and past performance of the service providers and/or facilities.

In step 810, the roadside assistance system 700 may receive a roadside assistance request from a user. In this step 810, the user may utilize the roadside assistance application 705 on a mobile device 102, such as a cell phone, a smart phone, or a tablet/laptop computer to request roadside assistance. The user may also utilize the roadside assistance application 705 on a vehicle's on-board computer or navigation system. In an embodiment according to the disclosure, the system may receive the roadside assistance request via a hand-free set up that may be linked or communicatively connected to the mobile device 102 or the vehicle's on-board computer or navigation system. The roadside assistance request may include such requests such as the type of roadside assistance, i.e. towing, repair services, on-site repair services, etc. The roadside assistance request may also include a request for personnel to be transported with the towed vehicle.

In step 815, the roadside assistance system 700 may receive telematics information. The telematics information may be sent from the telematics module 755 and/or a telematics device 710 located in the vehicle or as part of the mobile device 102. The telematics information may include information regarding the user and/or the user's vehicle. The telematics information may include information such as the user's location, the user's velocity (both instantaneous and/or average), the user's direction of travel, the user's route and final destination. This telematics information may then be utilized to assist in providing further information to the system and the roadside assistance application 705.

In addition to step 815, in step 820, the roadside assistance system 700 may also receive insurance information 735. Insurance information 735 may be utilized with the computer-implemented method and system that may reside on an insurance server 730 and/or the insurance module 770. The insurance information 735 may include information about a particular user, location and instances of previous accidents, locations and instances of previous claims, information about other users with similar characteristics, etc. The insurance information 735 may also include the make/model/type of vehicle of the user, which may assist in the selection of the type of tow truck required (i.e. trailer or hook). For example, the insurance information 735 may provide the make/model/type of the vehicle, such as an all-wheel drive vehicle which might establish whether a hook-type tow truck can tow or whether a flatbed tow truck is required. The insurance information 735 may provide whether the vehicle is under warranty and know what the covered services are for the vehicle. The insurance information 735 may also include billing information of the user. The insurance information 735 may also include previous repairs and work as performed during the history of the vehicle. The insurance information 735 may also include preventative repairs and information that are needed based on the telematics information.

Additionally, in step 820, the roadside assistance system 700 may use a set of historical and/or insurance information 735 about the user to assist and manage the roadside assistance in meeting the roadside assistance request. Generally, the historical information and insurance information 735 may include customer information, insured information, vehicle information, locations and instances for previous accidents and previous insurance claims. The set of historical and/or insurance information 735 may include type of insurance and the primary address of the user. The roadside assistance system 700 may utilize the set of historical and/or insurance information 735 about the user to allocate roadside assistance to a service provider who may be an insured member based on the set of historical and/or insurance information 735. The roadside assistance system 700 may also utilize the set of historical and/or insurance information 735 about the user to pre-determine a list of service providers that currently are willing and available to provide roadside assistance to the user. The roadside assistance system 700 may also utilize the set of historical and/or insurance information 735 about the user to match locations of the potential roadside assistance, tow facilities, or repair facilities with the residence of the user.

Also in step 820, the roadside assistance system 700 may utilize historical information and/or insurance information 735 to determine a safe route for a potential service provider for the tow truck or roadside assistance route to the user. Based on the historical information and/or insurance information 735, the roadside assistance system 700 may know where the tow truck or roadside assistance is currently located and provide the safest route and/or a prioritized list of those service providers to the current location of the user and potentially to the requested delivery location of the user. The roadside assistance system 700 may further utilize the historical and/or insurance information 735 such as previous accident locations and/or insurance claims to assist in selecting the safest route to the service providers and/or the current location and requested delivery location of the user. The roadside assistance system 700 may provide recommendations for the safest routes and rate the routes and the service providers based on the previous accidents and claims in the historical and/or insurance information 735.

In step 825, the roadside assistance system 700 may provide a prioritized ranking of service providers based on the telematics information and the roadside assistance request. For example, if the roadside assistance request includes a towing service request, the system will provide a prioritized ranking of towing service providers closest to the user and based on the user's location and/or user's final destination. Additionally, based on the telematics data and the roadside assistance request, the roadside assistance system 700 may know where the user is and the direction of travel of the tow trucks and/or other service providers and therefore provide the safest route for the service providers and/or a prioritized list of those service providers. Additionally, in another embodiment of the invention in providing the prioritized ranking, the roadside assistance system 700 may consider: (a) availability of nearby towing facilities or roadside assistance facilities; (b) telematics information from the vehicle; (c) preset preferences from the user (such as a preferred service provider, preferred towing provider, preferred repair facility); (d) insurance information (such as the type of vehicle the user has and the user's home address); or (e) the capabilities of the towing facility or roadside assistance facilities. In another embodiment of the invention, the roadside assistance system 700 may provide a sortable feature that provides the user with a sortable list of service providers in one or more of the following areas: closest service providers to the user's home, lowest price service providers, best ratings/reviews for the service providers, fastest estimated time of arrival, or other potential areas known to those of skill in the art.

In addition, in step 825, the roadside assistance system 700 may provide additional ranking of service providers based on insurance information 735. The roadside assistance system 700 may use the insurance information 735 of previous accident locations and claims to assist in selecting the route or the service providers. The roadside assistance system 700 may provide recommendations for the safest routes and rate the routes and the potential service providers based on the previous accidents and claims in the insurance information 735.

Also in step 825, the roadside assistance system 700 may use the insurance information 735 of the particular user and information about users with similar characteristics to provide recommendations regarding routes and service provider destinations. Based on the user characteristics and past behavior, the roadside assistance system 700 may prioritize a list of potential service providers or routes for the individual that the system determines will best meet the preferences of the individual.

In step 830, the roadside assistance system 700 may provide service provider information regarding any of the service providers on the prioritized service provider ranking list. This service provider information may include, but not be limited to location, cost, service provider type, and roadside assistance type. The service provider information may also include additional knowledge of the service providers and/or roadside assistance providers. The service provider information may include ratings and reviews from other users of the roadside assistance system 700. The service provider may also include ratings and reviews received from third-party reviewers. Additionally, the service provider information may include information about qualified and/or registered service providers or roadside assistance providers. Additionally, the service provider information may include real-time information about a given service provider, such as wait time, travel time, tow truck locations, tow truck availability, etc.

Additionally, in step 830, the service provider may be authorized to pick up both the vehicle and people. In some example embodiments, some police departments may have a contract with a particular service provider. Additionally, there may be limitations placed on the inventory of tow trucks, for example in a certain city, where the police may have an agreement with one towing service provider and the roadside assistance system 700 may include qualification for only this particular towing service provider for the type of tow in the certain city.

Also in step 830, the roadside assistance system 700 may also provide service provider information based on a specific search request within the roadside assistance order application. The user may search for a specific service provider within the roadside assistance order application with the return of the service provider information for the searched service provider or roadside assistance requirements.

In step 835, the roadside assistance system 700 may then receive a roadside assistance order from the user. The roadside assistance system 700 may provide the user with several options for tow trucks and/or roadside assistance and provide the various characteristics and options for those tow trucks and/or roadside assistance (time to location, cost, quality rating, prioritized ranking, etc.). The user may input the roadside assistance order via the service provider information on the mobile device 102 and the roadside assistance application 705 provided in steps 830. The user may select the roadside assistance order with a simple one or two-button sequence. Additionally, the user may input the roadside assistance order using the hands-free service within their vehicle that is wirelessly connected to the mobile device 102 and/or the roadside assistance application 705. In another embodiment, in step 835, the roadside assistance system 700 may automatically select the tow truck and/or roadside assistance order and send the tow truck with the highest score based on the rating factors and rank as determined in step 825. This automatic selection of the tow truck and/or the roadside assistance may be provided by a pre-determined algorithm utilizing one or many of the factors detailed in this invention.

In step 840, the roadside assistance system 700 may transmit the roadside assistance order to the selected service provider. The selected service provider may have a service provider server 780 or processor that communicates with the roadside assistance application 705 and the roadside assistance system 700. The selected service provider may require the necessary hardware and/or software to communicate with the roadside assistance application 705 and the roadside assistance system 700. Additionally in step 840, the service provider sends the requested tow truck and/or roadside assistance to meet the roadside assistance request.

In step 845, the roadside assistance system 700 may receive a confirmation of the order from the service provider server 780. The confirmation of the order may be received via one or more of the following methods: email, text, phone call, social media, etc. Additionally, the confirmation of the order may be received through an intermediary through one or more of the following methods: email, text, phone call, social media, etc.

In step 850, the roadside assistance system 700 may provide tracking information on the status of the selected tow truck and/or the roadside assistance. The service provider server 780 may send the location, distance, travel, and time to destination of the selected tow truck and/or roadside assistance. The selected tow truck and/or roadside assistance may include a telematics device or a GPS system that will provide the location, distance traveled, and time and/or distance to the destination of the selected tow truck and/or roadside assistance. The roadside assistance system 700 may provide the tracking information to the mobile device 102 of the user. The tracking information may be in the form of a table or form or may be in the form of a map on the mobile device. The mobile device 102 may include a map of the area that shows both the location for the requested roadside assistance location and the real-time location of the tow truck and/or roadside assistance.

In step 855, the roadside assistance system 700 may also provide an electronic payment for the roadside assistance to the service provider server 780 utilizing the electronic payment module 760. The electronic payment may be made automatically to the service provider server 780 and facilitated by the user entering their payment information into the roadside assistance application 705 during a set-up portion of the application. The electronic payment may utilize back billing information from the insurance information 735, which may include a credit card details or bank details or other already-verified electronic payment methods. The electronic payment may also be made to the service provider server 780 manually for an individual order by entering the payment information when the order is placed. Additionally, the payment may be made by or through an intermediary without departing from the invention.

In another aspect of this invention, the roadside assistance system 700 may provide rewards to the user depending on the service providers chosen by the user and/or the roadside assistance ordered by the user. The roadside assistance system 700 may also provide rewards based on the user's decision to follow the recommendations of the system. The rewards may include cash back, a reward at the service providers, a discount at the service providers, and/or a bonus roadside assistance item (such as 50% off oil change or tire rotation).

In another aspect of this invention, the roadside assistance system 700 may provide insurance rewards to the user depending on the service providers chosen by the user and/or the roadside assistance ordered by the user. The roadside assistance system 700 may also provide insurance rewards based on the user's decision to follow the recommendations of the system. The insurance rewards may include discounts on future premiums, increased insurance coverage, and/or decreased deductible.

Additionally, in another embodiment, the roadside assistance system 700 may provide rewards to the service provider or the roadside assistance provider, such as if the service providers deliver great service. The tow facility or service provider that provides a high quality service may receive a reward back in response to high quality service.

In another aspect of this invention, the roadside assistance system 700 may use the roadside assistance information in deriving insurance rating factors for insurance coverage. For example, the roadside assistance system 700 may keep track and analyze which service providers the user orders from, the locations of those service providers, when the user orders roadside assistance, and the type of roadside assistance ordered, the frequency of orders, etc. Based on the analysis of these orders and this information among millions of users, the system may derive rating factors from the information. Many other variables and rating factors may be utilized with this order information, without departing from this disclosure.

In another exemplary embodiment, knowledge of accidents and risk may be utilized to augment and/or supplement the roadside assistance system. For example, an insurance company's knowledge of accidents and risks can be used to suggest routes and destinations for the delivery and selection of the roadside assistance. In another exemplary embodiment, use of user information for prioritization may be utilized to augment and/or supplement the roadside assistance system 700. For example, insurance companies have a wealth of knowledge about particular customers and customers that share particular characteristics and the insurance companies may use that information to enhance the roadside assistance system 700.

In another aspect of this invention, the roadside assistance system 700 may provide an additional revenue model. The revenue model provides that a middle organization may take a portion of the transaction revenue by facilitating the matching of users who need towing services or roadside assistance with the towing service providers and roadside assistance providers.

In yet another aspect of this invention, in this roadside assistance system 700, the user or customer can directly schedule the towing service, thereby bypassing the dispatching systems. The user or customer is the sole actor dispatching the tow truck. An email or text confirmation may be sent out through the roadside assistance system 700 verifying the completion or fulfillment of the tow truck or roadside assistance. This confirmation may be sent through or by an intermediary without departing from the invention. If the user does not use the service after the order has been placed, a note may be sent (via text or email) to the user and a note or comment go into the user's registration file. If consistently missed or determined to be a serious violation, the user may be voted off or out of the roadside assistance system 700 or forced to pay a penalty amount.

The foregoing presents a simplified summary of the disclosure in order to provide a basic understanding of some aspects. It is not intended to identify key or critical elements of the invention or to delineate the scope of the invention. Although not required, one of ordinary skill in the art will appreciate that various aspects described herein may be embodied as a method, a data processing system, or as a computer-readable medium storing computer-executable instructions. Accordingly, those aspects may take the form of an entirely hardware embodiment, an entirely software embodiment or an embodiment combining software and hardware aspects. For example, a tangible computer-readable medium (e.g., a CD-ROM, RAM, hard drive, flash memory, etc.) storing instructions to cause a processor to perform methods in accordance with aspects of the disclosure is contemplated.

Numerous trademarks and/or service marks have been used throughout this disclosure. These trademarks and/or service marks are owned by their respective companies.

Aspects of the invention have been described in terms of illustrative embodiments thereof. Numerous other embodiments, modifications and variations within the scope and spirit of the disclosed invention will occur to persons of ordinary skill in the art from a review of this entire disclosure. For example, one of ordinary skill in the art will appreciate that the steps illustrated in the illustrative figures may be performed in other than the recited order, and that one or more steps illustrated may be optional in accordance with aspects of the disclosure.

We claim:

1. A method comprising:

receiving, through a mobile application executing on a mobile device having at least one processor, a roadside assistance request from a user, wherein the roadside assistance request is received through the mobile device;

receiving, by the mobile application, telematics information from a telematics device;

receiving, by the mobile application, insurance information from an insurance company, wherein the insurance information includes information about the user, vehicle information, and the user's home location;

providing, by the mobile application, a prioritized ranking of roadside assistance service providers based on the telematics information, insurance information, and the roadside assistance request;

providing, by the mobile application, roadside assistance provider information based on the prioritized ranking of roadside assistance providers;

receiving, by the mobile application, a roadside assistance order from the user that includes a selected roadside assistance provider;

transmitting, by the mobile application, the roadside assistance order to the selected roadside assistance provider;

receiving, by the mobile application, confirmation of the roadside assistance order from the selected roadside assistance provider; and providing, by the mobile application, an electronic payment to the selected roadside assistance provider for the roadside assistance order.

2. The method of claim 1 further include the step of: providing, by the mobile application, a reward to the user based on the roadside assistance order, wherein the reward is one or more of the following: cash back, a discount for the roadside assistance order, or a bonus roadside assistance item for the roadside assistance order.

3. The method of claim 1 further include the step of: providing, by the mobile application, a reward to the user based on the roadside assistance order, wherein the reward is one or more of the following: a discount of future insurance premiums for the user, increased insurance coverage for the user, or a decreased deductible for insurance coverage for the user.

4. The method of claim 1, wherein the prioritized ranking of roadside assistance service providers is based on the insurance information to select a route to the user from the location of the service provider that is a safest route based on the previous accidents and previous claims in the insurance information.

5. The method of claim 1, further including the step of: receiving, by the mobile application, a set of tracking information for the selected roadside assistance provider.

6. The method of claim 5, wherein the set of tracking information includes location, velocity, route, and destination of the selected roadside assistance provider.

7. The method of claim 1, wherein the roadside assistance service provider information includes: locations of available roadside assistance service providers, type of roadside assistance service providers, and a set of ratings of the roadside assistance service providers.

8. The method of claim 1, wherein the roadside assistance service provider information includes real-time information that includes one or more of the following: a wait time, a time-to-arrival time, service provider locations, service provider availability.

9. One or more non-transitory computer readable media storing computer readable instructions that, when executed, cause an apparatus to:
(a) after occurrence of a roadside event to a vehicle, receive input at a mobile device regarding the roadside event to the vehicle;
(b) receive, through a mobile application executing on the apparatus, a roadside assistance request from a user, wherein the roadside assistance request is received through the mobile device and relates to the roadside event to the vehicle;
(c) receive, by the mobile application, telematics information from a telematics device, wherein the telematics information includes information from the vehicle to assist with a diagnosis and repairs for the roadside event to the vehicle;
(d) receive, by the mobile application, insurance information from an insurance company, wherein the insurance information includes information about the user, vehicle information, and the user's home address;
(e) determine and provide, by the mobile application, a prioritized ranking of roadside assistance providers based on the telematics information, the insurance information, and the roadside assistance request;
(f) provide, by the mobile application, roadside assistance service provider information based on the prioritized ranking of roadside assistance service providers;
(g) receive, by the mobile application, a roadside assistance order automatically selected by the mobile application based on the roadside assistance service provider that scores the highest according to a preset algorithm, wherein the roadside assistance order include a selected roadside assistance provider;
(h) transmit, by the mobile application, the roadside assistance order to the selected roadside assistance provider; and
(i) provide, by the mobile application, an electronic payment to the selected roadside assistance provider for the roadside assistance order.

10. The one or more non-transitory computer readable media of claim 9, wherein the prioritized ranking of roadside assistance service providers is based on the insurance information to select a route to the vehicle from the selected service provider that is a safest route based on the previous accidents and previous claims in the insurance information.

11. The one or more non-transitory computer readable media of claim 9, wherein the prioritized ranking of roadside assistance service providers is based on the following factors: an availability of nearby roadside assistance service providers, telematics information from the vehicle to assist with the diagnosis and repairs of the vehicle, preset preferences of the user, the insurance information, and a set of capabilities of the roadside assistance service providers.

12. The one or more non-transitory computer readable media of claim 9, wherein the wherein the roadside assistance service provider information includes: location of available roadside assistance service providers, type of roadside assistance service providers, and a set of ratings of the roadside assistance service provider.

13. The one or more non-transitory computer readable media of claim 9, wherein the roadside assistance service provider information includes real-time information that includes one or more of the following: a wait time, a time-to-arrival time, service provider locations, service provider availability.

14. The one or more non-transitory computer readable media of claim 9, where the roadside event comprises at least one of: a lock out of the vehicle, a flat tire of the vehicle, a dead battery of the vehicle, an out of gas condition of the vehicle, and a mechanical failure of the vehicle.

* * * * *